US012290908B2

(12) United States Patent
Ward et al.

(10) Patent No.: US 12,290,908 B2
(45) Date of Patent: May 6, 2025

(54) POWERED FASTENER DRIVER

(71) Applicant: MILWAUKEE ELECTRIC TOOL CORPORATION, Brookfield, WI (US)

(72) Inventors: Bryan C. Ward, Wauwatosa, WI (US); Jacob N. Zimmerman, Pewaukee, WI (US); Andrew J. Weber, Cudahy, WI (US); Marcus Wechselberger, Milwaukee, WI (US); Leonard F. Mikat-Stevens, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/168,965

(22) Filed: Feb. 14, 2023

(65) Prior Publication Data

US 2023/0191574 A1 Jun. 22, 2023

Related U.S. Application Data

(63) Continuation of application No. 17/210,979, filed on Mar. 24, 2021, now Pat. No. 11,975,432.

(Continued)

(51) Int. Cl.
*B25C 1/04* (2006.01)

(52) U.S. Cl.
CPC .............. *B25C 1/043* (2013.01); *B25C 1/047* (2013.01)

(58) Field of Classification Search
CPC ........... B25C 1/043; B25C 1/005; B25C 1/06; B25C 1/047
See application file for complete search history.

(56) References Cited

U.S. PATENT DOCUMENTS 2,401,794 A 6/1946 Pratt
2,660,726 A 12/1953 Weingart (Continued)

FOREIGN PATENT DOCUMENTS

AU 2012200927 B2 8/2013
CN 2617534 Y 5/2004

(Continued)

OTHER PUBLICATIONS

Bostitch Instruction Manual-BTFP2350 Pin Nailer, May 2018 (32 pages).

(Continued)

*Primary Examiner* — Thomas M Wittenschlaeger
(74) *Attorney, Agent, or Firm* — Michael Best & Friedrich LLP

(57) ABSTRACT

A fastener driver includes a cylinder, a moveable piston positioned within the cylinder, and a driver blade attached to the piston and movable therewith between a top-dead-center (TDC) position and a bottom-dead-center (BDC) position. The driver blade including a body and a plurality of teeth extending therefrom. A lifter is operable to move the driver blade from the BDC position toward the TDC position. The lifter including a plurality of lugs engageable with the teeth of the driver blade when moving the driver blade from the BDC position toward the TDC position. The body of the driver blade has a first thickness and at least a first of the teeth has a second thickness that is greater than the first thickness and the first tooth has a stepped configuration relative to the body.

21 Claims, 19 Drawing Sheets

Related U.S. Application Data

(60) Provisional application No. 63/129,056, filed on Dec. 22, 2020, provisional application No. 63/056,904, filed on Jul. 27, 2020, provisional application No. 62/994,361, filed on Mar. 25, 2020.

(56) References Cited

U.S. PATENT DOCUMENTS

| | | | |
|---|---|---|---|
| 2,790,174 | A | 4/1957 | Magnuson |
| 3,406,889 | A | 10/1968 | Cast et al. |
| 3,437,249 | A | 4/1969 | Baum |
| 3,494,530 | A | 2/1970 | Bade |
| 3,768,573 | A | 10/1973 | Jennings |
| 3,820,705 | A | 6/1974 | Beals |
| 4,049,181 | A | 9/1977 | Kametaki |
| 4,053,094 | A | 10/1977 | Males |
| 4,389,012 | A | 6/1983 | Grikis et al. |
| 4,463,888 | A | 8/1984 | Geist et al. |
| 4,558,811 | A | 12/1985 | Klaus et al. |
| 4,566,619 | A | 1/1986 | Kleinholz |
| 4,767,043 | A | 8/1988 | Canlas, Jr. |
| 4,784,306 | A | 11/1988 | Baum |
| 5,028,858 | A | 7/1991 | Schnizler et al. |
| 5,105,130 | A | 4/1992 | Barker et al. |
| 5,192,012 | A | 3/1993 | Schafer et al. |
| 5,197,646 | A | 3/1993 | Nikolich |
| 5,263,842 | A | 11/1993 | Fealey |
| 5,346,342 | A | 9/1994 | Winchester |
| 5,368,213 | A | 11/1994 | Massari, Jr. |
| 5,564,614 | A | 10/1996 | Yang |
| 5,593,079 | A | 1/1997 | Mukoyama et al. |
| 5,626,274 | A | 5/1997 | Shkolnikov et al. |
| 5,647,525 | A | 7/1997 | Ishizawa |
| 5,649,660 | A | 7/1997 | Akiba et al. |
| 5,683,024 | A | 11/1997 | Eminger et al. |
| 5,720,423 | A | 2/1998 | Kondo et al. |
| 5,727,726 | A | 3/1998 | Lin |
| 5,733,089 | A | 3/1998 | Albright |
| 5,813,588 | A | 9/1998 | Lin |
| 5,927,585 | A | 7/1999 | Moorman et al. |
| 5,988,477 | A | 11/1999 | Deieso et al. |
| 6,092,711 | A | 7/2000 | Tinarelli |
| 6,161,746 | A | 12/2000 | Wey |
| 6,398,097 | B1 | 6/2002 | Liang |
| 6,422,446 | B1 | 7/2002 | Liu |
| 6,499,642 | B1 | 12/2002 | Amada |
| 6,588,112 | B2 | 7/2003 | Zeiler et al. |
| 6,598,777 | B2 | 7/2003 | Osuga et al. |
| 6,612,476 | B2 | 9/2003 | Smolinski |
| 6,626,345 | B2 | 9/2003 | Amada |
| 6,644,530 | B2 | 11/2003 | Chen |
| 6,655,572 | B2 | 12/2003 | Amada |
| 6,688,510 | B2 | 2/2004 | Amada |
| 6,708,861 | B2 | 3/2004 | Osuga et al. |
| 6,729,523 | B1 | 5/2004 | Wang et al. |
| 6,729,524 | B1 | 5/2004 | Yao |
| 6,763,989 | B2 | 7/2004 | Wang |
| 6,769,591 | B2 | 8/2004 | Yamamoto et al. |
| 6,814,154 | B2 | 11/2004 | Chou |
| 6,820,789 | B2 | 11/2004 | Lipsky et al. |
| 6,851,594 | B1 | 2/2005 | Huang |
| 6,902,092 | B2 | 6/2005 | Osuga et al. |
| 6,908,021 | B1 | 6/2005 | Wang |
| 6,938,813 | B1 | 9/2005 | Chen |
| 6,953,137 | B2 | 10/2005 | Nakano et al. |
| 7,004,367 | B1 | 2/2006 | Shen et al. |
| 7,004,368 | B1 | 2/2006 | Chen |
| 7,040,522 | B2 | 5/2006 | Osuga et al. |
| 7,070,081 | B2 | 7/2006 | Tadayoshi et al. |
| 7,137,540 | B2 | 11/2006 | Terrell et al. |
| 7,303,103 | B2 | 12/2007 | Wang |
| 7,497,364 | B2 | 3/2009 | Lee |
| 7,513,402 | B2 | 4/2009 | Miyashita et al. |
| 7,520,413 | B1 | 4/2009 | Cho et al. |
| 7,600,661 | B2 | 10/2009 | Adachi |
| 7,810,688 | B2 | 10/2010 | Wu et al. |
| 7,827,950 | B2 | 11/2010 | Hu et al. |
| 7,828,073 | B2 | 11/2010 | Liebert et al. |
| 7,971,766 | B2 | 7/2011 | Tang |
| 8,011,441 | B2 | 9/2011 | Leimbach et al. |
| 8,011,547 | B2 | 9/2011 | Leimbach et al. |
| 8,083,116 | B2 | 12/2011 | Liang |
| 8,118,204 | B2 | 2/2012 | Ishida et al. |
| 8,167,184 | B2 | 5/2012 | Kuechler et al. |
| 8,181,836 | B2 | 5/2012 | Shkolnikov et al. |
| D662,808 | S | 7/2012 | Vandenberg |
| 8,230,941 | B2 | 7/2012 | Leimbach et al. |
| 8,267,295 | B2 | 9/2012 | Wu et al. |
| 8,267,296 | B2 | 9/2012 | Leimbach et al. |
| 8,267,297 | B2 | 9/2012 | Leimbach et al. |
| 8,286,722 | B2 | 10/2012 | Leimbach et al. |
| D677,147 | S | 3/2013 | Vandenberg |
| 8,387,718 | B2 | 3/2013 | Leimbach et al. |
| 8,480,343 | B2 | 7/2013 | Vandenberg |
| D693,210 | S | 11/2013 | Vandenberg |
| 8,602,282 | B2 | 12/2013 | Leimbach et al. |
| 8,672,204 | B2 | 3/2014 | Vandenberg |
| 8,678,262 | B2 | 3/2014 | Zhou et al. |
| 8,747,043 | B2 | 6/2014 | Vandenberg |
| 8,763,874 | B2 | 7/2014 | Mccardle et al. |
| 8,777,081 | B2 | 7/2014 | Chen et al. |
| 8,800,834 | B2 | 8/2014 | Pedicini et al. |
| 8,851,201 | B2 | 10/2014 | Limberg et al. |
| D717,625 | S | 11/2014 | Martone |
| 8,925,644 | B2 | 1/2015 | Vandenberg |
| 8,955,210 | B2 | 2/2015 | Vandenberg |
| 9,051,726 | B2 | 6/2015 | Vandenberg |
| 9,120,214 | B2 | 9/2015 | Vandenberg |
| 9,144,896 | B2 | 9/2015 | Vandenberg |
| D756,739 | S | 5/2016 | Caglar |
| D756,740 | S | 5/2016 | Caglar |
| 9,328,815 | B2 | 5/2016 | Nomura et al. |
| 9,346,156 | B1 | 5/2016 | Fago |
| 9,469,021 | B2 | 10/2016 | Gregory et al. |
| 9,473,053 | B2 | 10/2016 | Lim et al. |
| 9,486,904 | B2 | 11/2016 | Gregory et al. |
| 9,498,871 | B2 | 11/2016 | Gregory et al. |
| 9,643,305 | B2 | 5/2017 | Gregory et al. |
| 9,649,755 | B2 | 5/2017 | Gregory et al. |
| 9,676,088 | B2 | 6/2017 | Leimbach et al. |
| 9,751,197 | B2 | 9/2017 | Vandenberg |
| 9,784,296 | B2 | 10/2017 | Vandenberg |
| 9,802,300 | B2 | 10/2017 | Vandenberg |
| 9,827,658 | B2 | 11/2017 | Gregory et al. |
| 9,868,196 | B2 | 1/2018 | Chien |
| 10,173,310 | B2 | 1/2019 | Wyler et al. |
| 10,315,295 | B2 | 6/2019 | Vandenberg |
| 10,352,429 | B2 | 7/2019 | Hagiwara et al. |
| 10,478,954 | B2 | 11/2019 | Leimbach et al. |
| 10,549,412 | B2 | 2/2020 | McCardle et al. |
| 10,625,407 | B2 | 4/2020 | Sato et al. |
| 10,632,600 | B2 | 4/2020 | Pomeroy et al. |
| 10,632,601 | B2 | 4/2020 | Pomeroy et al. |
| 2002/0059731 | A1 | 5/2002 | Zeiler et al. |
| 2003/0146262 | A1 | 8/2003 | Hwang et al. |
| 2004/0134960 | A1 | 7/2004 | Schiestl et al. |
| 2004/0211810 | A1 | 10/2004 | Ho et al. |
| 2005/0001007 | A1 | 1/2005 | Butzen et al. |
| 2006/0016845 | A1 | 1/2006 | Ishizawa et al. |
| 2006/0091176 | A1 | 5/2006 | Cannaliato et al. |
| 2006/0091177 | A1 | 5/2006 | Cannaliato et al. |
| 2006/0249554 | A1 | 11/2006 | Butzen et al. |
| 2007/0210134 | A1 | 9/2007 | Oda et al. |
| 2008/0011592 | A1 | 1/2008 | Liebert et al. |
| 2008/0041911 | A1 | 2/2008 | Lee |
| 2008/0078799 | A1 | 4/2008 | Wen |
| 2008/0264998 | A1 | 10/2008 | Lee |
| 2009/0039135 | A1 | 2/2009 | Kubo |
| 2009/0050667 | A1 | 2/2009 | Po |
| 2009/0056965 | A1 | 3/2009 | Moessnang |
| 2009/0101690 | A1 | 4/2009 | Kubo |
| 2009/0152322 | A1 | 6/2009 | Lin |
| 2009/0261141 | A1 | 10/2009 | Stratton et al. |
| 2012/0274245 | A1 | 11/2012 | Takano et al. |

(56) References Cited

U.S. PATENT DOCUMENTS

| | | | |
|---|---|---|---|
| 2013/0320064 A1 | 12/2013 | Gregory et al. | |
| 2015/0202755 A1 | 7/2015 | Tanji et al. | |
| 2016/0151900 A1 | 6/2016 | Wu et al. | |
| 2016/0214247 A1 | 7/2016 | Lee | |
| 2016/0229043 A1* | 8/2016 | Wyler | B25C 1/047 |
| 2016/0368126 A1 | 12/2016 | Liu et al. | |
| 2018/0036870 A1 | 2/2018 | Komazaki et al. | |
| 2018/0071904 A1 | 3/2018 | Gregory et al. | |
| 2018/0085904 A1 | 3/2018 | Gregory et al. | |
| 2018/0126529 A1 | 5/2018 | Pomeroy et al. | |
| 2018/0126530 A1 | 5/2018 | Pomeroy et al. | |
| 2018/0126532 A1 | 5/2018 | Pomeroy et al. | |
| 2018/0133877 A1 | 5/2018 | Ueda | |
| 2018/0154505 A1 | 6/2018 | Sato et al. | |
| 2018/0178361 A1 | 6/2018 | Kabbes et al. | |
| 2018/0243889 A1 | 8/2018 | Myers et al. | |
| 2018/0290279 A1 | 10/2018 | Kobori et al. | |
| 2018/0326567 A1 | 11/2018 | Liu et al. | |
| 2019/0039219 A1 | 2/2019 | Suarez | |
| 2019/0091845 A1 | 3/2019 | Wyler et al. | |
| 2019/0126453 A1 | 5/2019 | Po | |
| 2019/0168366 A1 | 6/2019 | Yasutomi et al. | |
| 2019/0202042 A1 | 7/2019 | Wu et al. | |
| 2019/0202043 A1 | 7/2019 | Noguchi et al. | |
| 2019/0224831 A1 | 7/2019 | Yamamoto et al. | |
| 2019/0255689 A1* | 8/2019 | Leimbach | B25C 5/13 |
| 2019/0299380 A1 | 10/2019 | Meyer et al. | |
| 2019/0321955 A1* | 10/2019 | Carrier | B25C 1/04 |
| 2019/0337136 A1 | 11/2019 | Hays et al. | |
| 2019/0375084 A1 | 12/2019 | Bierdeman et al. | |
| 2020/0030953 A1 | 1/2020 | Tan et al. | |
| 2020/0070330 A1 | 3/2020 | Carrier et al. | |
| 2020/0114500 A1 | 4/2020 | Bierdeman et al. | |
| 2020/0122308 A1 | 4/2020 | Bradley et al. | |
| 2020/0164498 A1 | 5/2020 | Wechselberger et al. | |
| 2020/0223044 A1 | 7/2020 | Xiao Chuan et al. | |
| 2020/0238493 A1 | 7/2020 | Wierzchon | |
| 2020/0282534 A1 | 9/2020 | Po | |
| 2020/0290189 A1 | 9/2020 | Owens et al. | |
| 2021/0101272 A1 | 4/2021 | Saitou et al. | |
| 2021/0146517 A1 | 5/2021 | Shioya et al. | |
| 2021/0197350 A1 | 7/2021 | Umino et al. | |
| 2021/0205969 A1 | 7/2021 | Zhu et al. | |
| 2021/0229249 A1 | 7/2021 | Ootsuka et al. | |
| 2021/0245344 A1 | 8/2021 | Liu et al. | |
| 2021/0291335 A1 | 9/2021 | Liu et al. | |
| 2021/0299835 A1 | 9/2021 | Ward et al. | |
| 2021/0308852 A1 | 10/2021 | Ueda et al. | |
| 2022/0134524 A1 | 5/2022 | Shioya et al. | |
| 2022/0134525 A1 | 5/2022 | Bandy et al. | |
| 2022/0143798 A1 | 5/2022 | Cholst et al. | |
| 2022/0219301 A1 | 7/2022 | Bierdeman et al. | |
| 2022/0241947 A1 | 8/2022 | Ward et al. | |
| 2023/0090859 A1* | 3/2023 | Yasutomi | B25C 1/06 227/8 |

FOREIGN PATENT DOCUMENTS

| | | | |
|---|---|---|---|
| CN | 2709710 | Y | 7/2005 |
| CN | 202726856 | U | 2/2013 |
| CN | 103707264 | A | 4/2014 |
| CN | 204658357 | U | 9/2015 |
| CN | 205835215 | U | 12/2016 |
| CN | 108381465 | A | 8/2018 |
| DE | 1812301 | C3 | 5/1978 |
| DE | 2923997 | A1 | 1/1980 |
| DE | 7917080 | U1 | 5/1984 |
| DE | 202019102452 | U1 | 5/2019 |
| EP | 0086244 | A1 | 8/1983 |
| EP | 0550156 | A1 | 7/1993 |
| EP | 2842695 | A1 | 3/2015 |
| EP | 3150335 | A2 | 4/2017 |
| EP | 3403770 | A1 | 11/2018 |
| EP | 3554763 | A1 | 10/2019 |
| EP | 3603891 | A1 | 2/2020 |
| EP | 3730248 | A1 | 10/2020 |
| GB | 2025562 | A | 1/1980 |
| GB | 2244439 | A | 12/1991 |
| GB | 2295054 | A | 5/1996 |
| GB | 2411148 | B | 8/2008 |
| JP | 2559175 | Y2 | 1/1998 |
| JP | 2010023174 | A | 2/2010 |
| JP | 2014058039 | A | 4/2014 |
| JP | 2016047594 | A | 4/2016 |
| JP | 6203675 | B2 | 9/2017 |
| WO | 2010027943 | A1 | 3/2010 |
| WO | 2015037299 | A1 | 3/2015 |
| WO | 2019214088 | A1 | 11/2019 |
| WO | 2019241225 | A1 | 12/2019 |
| WO | 2021124835 | A1 | 6/2021 |

OTHER PUBLICATIONS

Parts List for DeWalt Pin Nailer, BTFP2350K Type 0, © 2005 (4 pages).

International Search Report and Written Opinion for Application No. PCT/US2021/023849 dated Sep. 2, 2021 (17 pages).

Draper, “10-50mm Air Stapler/Nailer,” Instruction Manual, May 2016 (24 pages).

Sealey, “Air Nail/Staple Gun 50mm/40mm Capacity,” Instruction Manual, Jun. 2017 (4 pages).

Extended European Search Report for Application No. 21774373.1 dated Aug. 27, 2024 (15 pages).

* cited by examiner

POWERED FASTENER DRIVER

CROSS-REFERENCE TO RELATED APPLICATIONS

This application is a continuation of U.S. patent application Ser. No. 17/210,979 filed on Mar. 24, 2021, now U.S. Pat. No. 11,975,432, which claims priority to U.S. Provisional Patent Application No. 63/129,056 filed on Dec. 22, 2020, U.S. Provisional Patent Application No. 63/056,904 filed on Jul. 27, 2020, and U.S. Provisional Patent Application No. 62/994,361 filed on Mar. 25, 2020, the entire contents of all of which are incorporated herein by reference.

FIELD OF THE INVENTION

The present invention relates to powered fastener drivers.

BACKGROUND OF THE INVENTION

There are various fastener drivers known in the art for driving fasteners (e.g., nails, tacks, staples, etc.) into a workpiece. These fastener drivers operate utilizing various means known in the art (e.g., compressed air generated by an air compressor, electrical energy, a flywheel mechanism, etc.), but often these designs are met with power, size, and cost constraints.

SUMMARY OF THE INVENTION

The present invention provides, in one aspect, a fastener driver including a cylinder, a moveable piston positioned within the cylinder, a driver blade attached to the piston and movable therewith between a top-dead-center (TDC) position and a bottom-dead-center (BDC) position, the driver blade including a body and a plurality of teeth extending therefrom and a lifter operable to move the driver blade from the BDC position toward the TDC position. The lifter including a plurality of lugs engageable with the teeth of the driver blade when moving the driver blade from the BDC position toward the TDC position. The body of the driver blade has a first thickness and at least a first of the teeth has a second thickness that is greater than the first thickness and wherein the first tooth has a stepped configuration relative to the body.

The present invention provides, in another aspect, a fastener driver including a cylinder, a moveable piston positioned within the cylinder, a driver blade attached to the piston and movable therewith between a top-dead-center (TDC) position and a bottom-dead-center (BDC) position, the driver blade including a body having a first side defining a first lateral edge and a second side defining a second lateral edge, the body having a plurality of teeth extending from the first side, and a lifter operable to move the driver blade from the BDC position toward the TDC position. The lifter including a plurality of lugs engageable with the teeth of the driver blade when moving the driver blade from the BDC position toward the TDC position. The second lateral edge of the driver blade has a first thickness and at least a first of the teeth has a second thickness that is greater than the first thickness, and the first tooth has a stepped configuration relative to the body.

The present invention provides, in another aspect, a fastener driver including a cylinder, a moveable piston positioned within the cylinder, a driver blade attached to the piston and movable therewith between a top-dead-center (TDC) position and a bottom-dead-center (BDC) position, the driver blade including a body and a plurality of teeth extending therefrom, a lifter operable to move the driver blade from the BDC position toward the TDC position, the lifter including a hub and a plurality of lugs extending therefrom, the plurality of lugs engageable with the of the driver blade when moving the driver blade from the BDC position toward the TDC position, and a transmission provided for providing torque to the lifter. Each lug is configured as a first type or a second type, a portion of the lug of the first type is configured to rotate relative to the hub, the lug of the second type is fixed relative to the hub, and a first one of the lugs is the first type. The body of the driver blade has a first thickness and at least a first tooth and a second tooth of the plurality of teeth each has a second thickness that is greater than the first thickness, each of the first and second teeth has a stepped configuration relative to the body, and each of the first and second teeth are engageable with the first one of the lugs of the first type.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
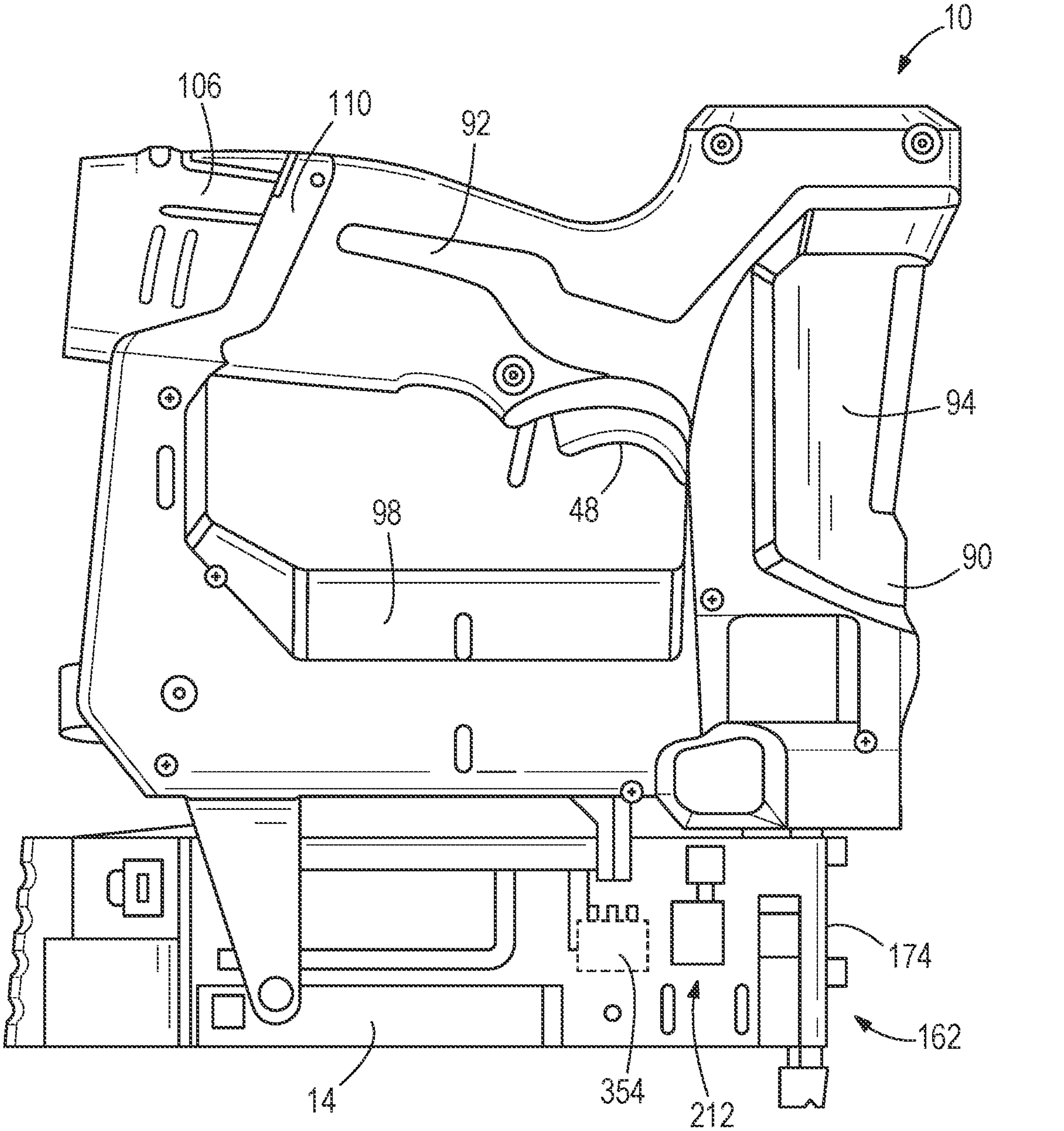
FIG. 1 is a side view of a powered fastener driver.
Figure 2:
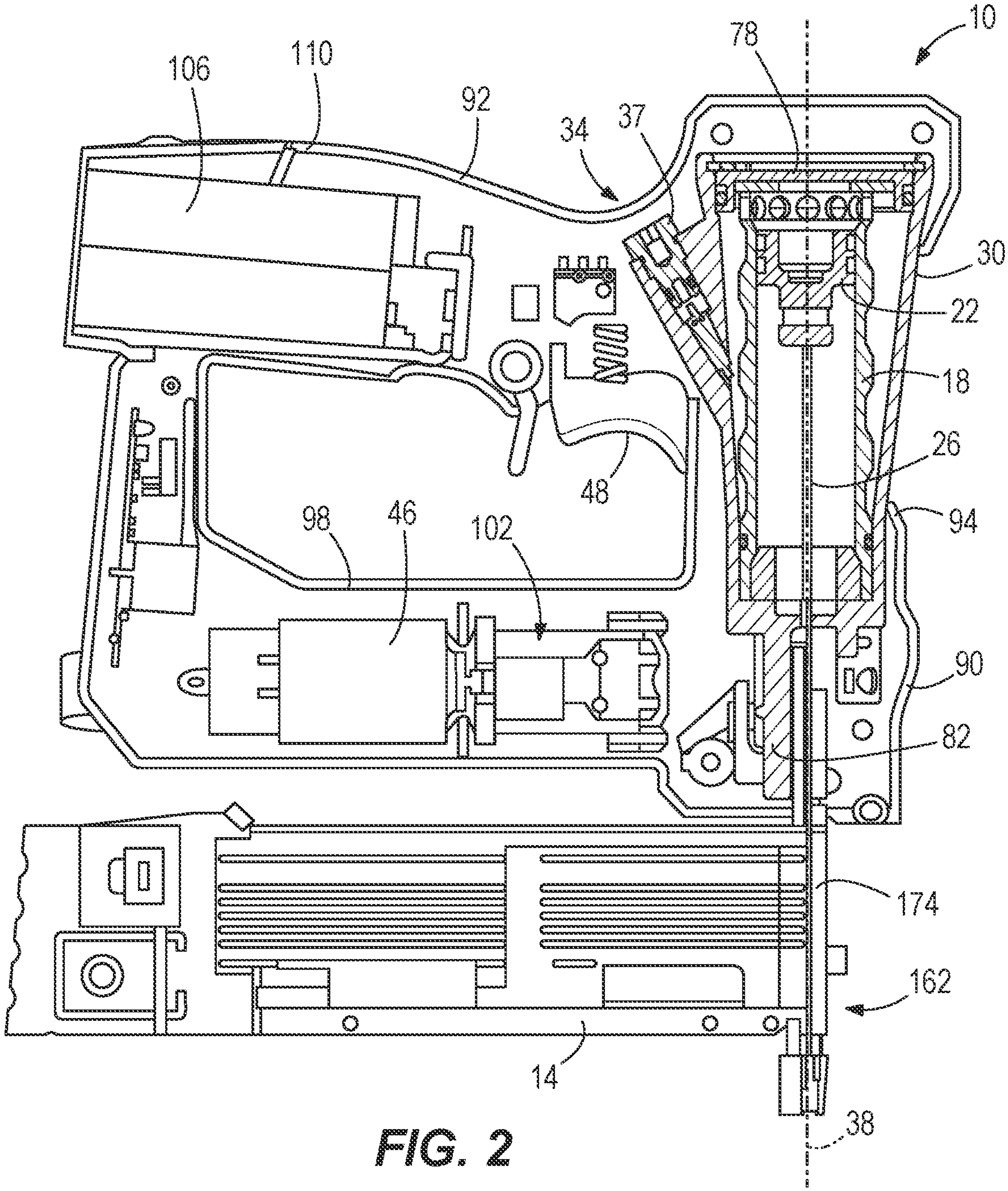
FIG. 2 is a side cross-sectional view of the powered fastener driver of FIG. 1, illustrating a frame assembly and a motor.

With reference to FIGS. 1-2, a powered fastener driver 10 is operable to drive fasteners (e.g., nails, tacks, staples, etc.) held within a magazine 14 into a workpiece. The fastener driver 10 includes an inner cylinder 18 and a moveable piston 22 positioned within the cylinder 18 (FIG. 2). The fastener driver 10 further includes a driver blade 26 that is attached to the piston 22 and moveable therewith. The fastener driver 10 does not require an external source of air pressure, but rather includes an outer storage chamber cylinder 30 of pressurized gas in fluid communication with the inner cylinder 18. In the illustrated embodiment, the inner cylinder 18 and moveable piston 22 are positioned within the storage chamber cylinder 30. With reference to FIG. 2, the driver 10 further includes a fill valve assembly 34 coupled to the storage chamber cylinder 30. When connected with a source of compressed gas, the fill valve assembly 34 permits the storage chamber cylinder 30 to be refilled with compressed gas if any prior leakage has occurred. The fill valve assembly 34 may be configured as a Schrader valve, for example.

Figure 3:
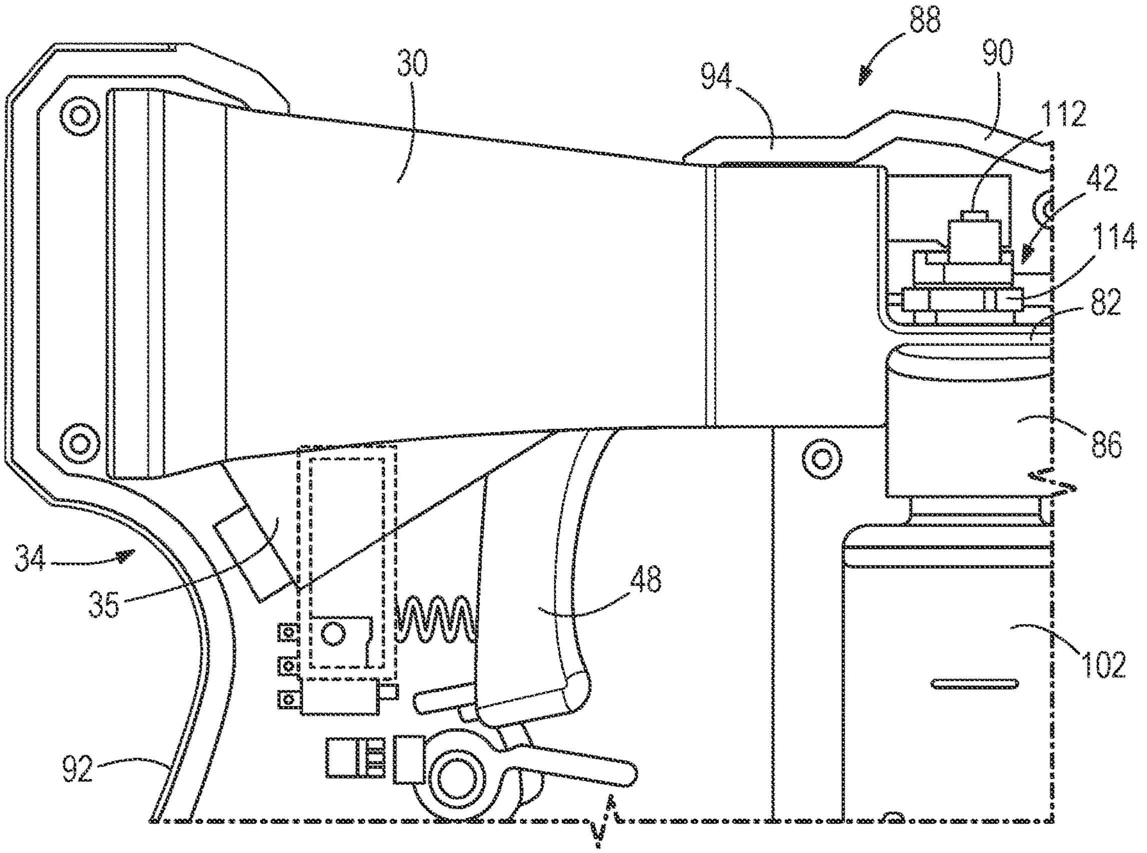
FIG. 3 is a partial cut-away view of the powered fastener driver of FIG. 1, with portions removed for clarity and illustrating the frame assembly of FIG. 2 including a lifter housing portion supporting a lifter.

With reference to FIGS. 2 and 3, the inner cylinder 18 and the driver blade 26 define a driving axis 38. During a driving cycle, the driver blade 26 and piston 22 are moveable between a top-dead-center (TDC) (i.e., retracted) position and a driven or bottom-dead-center (BDC) (i.e., extended) position. The fastener driver 10 further includes a lifting assembly 42 (FIG. 3), which is powered by a motor 46, and which is operable to move the driver blade 26 from the BDC position to the TDC position.

In operation, the lifting assembly 42 drives the piston 22 and the driver blade 26 toward the TDC position by energizing the motor 46. As the piston 22 and the driver blade 26 are driven toward the TDC position, the gas above the piston 22 and the gas within the storage chamber cylinder 30 is compressed. Prior to reaching the TDC position, the motor 46 is deactivated and the piston 22 and the driver blade 26 are held in a ready position, which is located between the TDC and the BDC positions, until being released by user activation of a trigger 48 (FIG. 3). When released, the compressed gas above the piston 22 and within the storage chamber cylinder 30 drives the piston 22 and the driver blade 26 toward the BDC position, thereby driving a fastener into the workpiece. The illustrated fastener driver 10 therefore operates on a gas spring principle utilizing the lifting assembly 42 and the piston 22 to further compress the gas within the inner cylinder 18 and the storage chamber cylinder 30. Further detail regarding the structure and operation of the fastener driver 10 is provided below.

Figure 5:
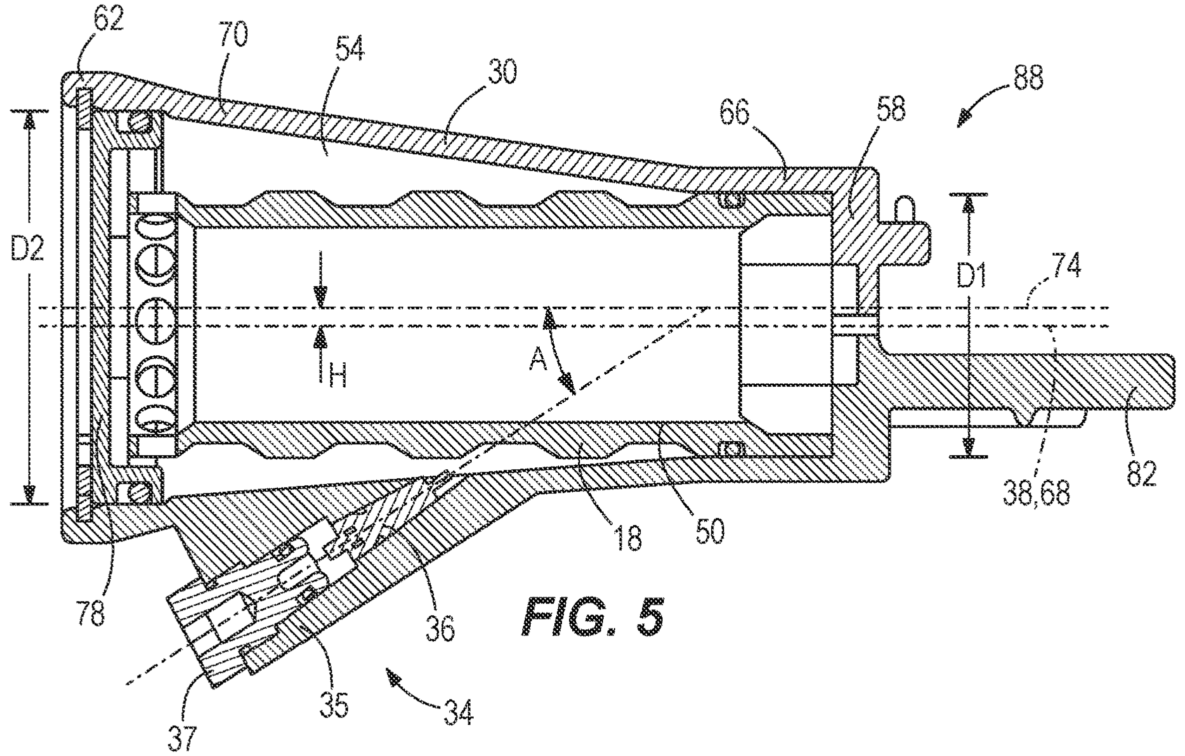
FIG. 5 is a side cross-sectional view of the frame assembly taken along line 5-5 in FIG. 4, illustrating an inner cylinder positioned in a storage chamber cylinder of the frame assembly.
Figure 6:
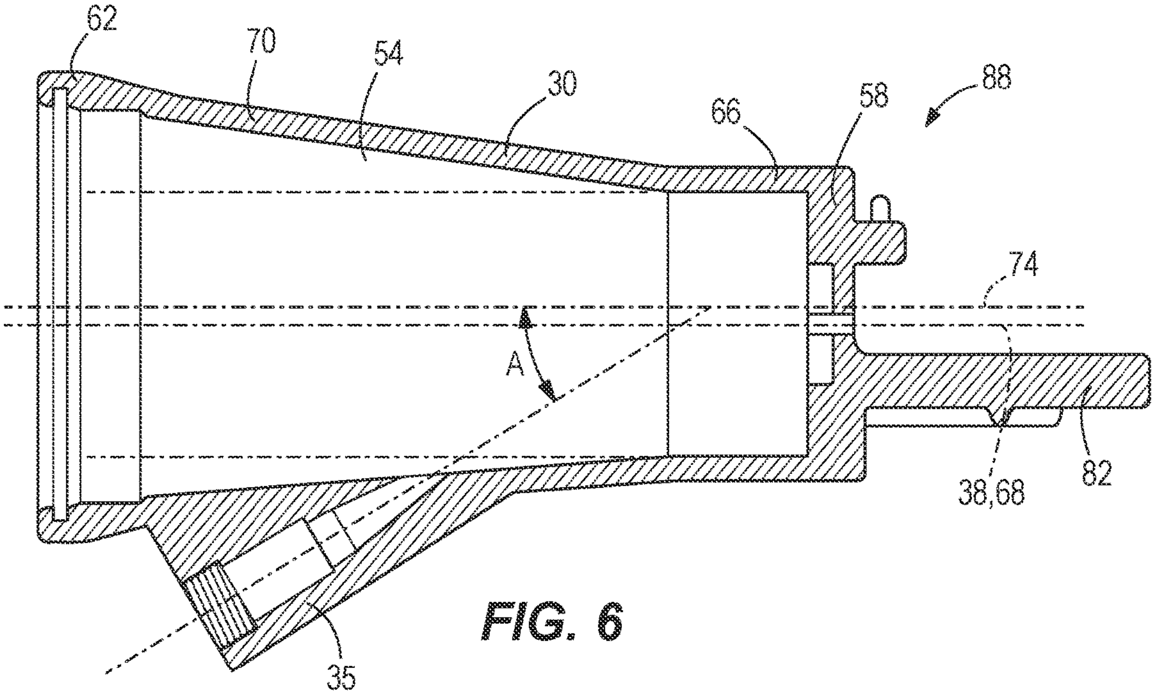
FIG. 6 is another side cross-sectional view of the frame assembly of FIG. 5 with the inner cylinder removed.

With reference to FIGS. 5 and 6, the cylinder 18 has an annular inner wall 50 configured to guide the piston 22 and driver blade 26 along the driving axis 38 to compress the gas in the storage chamber cylinder 30. The storage chamber cylinder 30 has an annular outer wall 54 circumferentially surrounding the inner wall 50. More specifically, the storage chamber cylinder 30 extends from a first end 58 to a second end 62. Each of the illustrated first and second ends 58, 62, respectively, are circular. The storage chamber cylinder 30 includes a first, cylindrical portion 66 and a second, frusto-conical portion 70 adjacent the cylindrical portion 66. The cylindrical portion 66 is adjacent the first end 58, and has a first inner diameter D1. The cylindrical portion 66 defines a first longitudinal axis 68 that is co-linear with the driving axis 38. The frusto-conical portion 70 is adjacent the second end 62. The frusto-conical portion 70 extends from the cylindrical portion 66 toward the second end 62 such that the second end 62 has a second inner diameter D2 that is greater than the first diameter D1. The frusto-conical portion 70 defines a second longitudinal axis 74 coaxial with the second circular end 62. In other words, the second end 62 defines the second longitudinal axis 74 that extends through a center of the second end 62. The second longitudinal axis 74 extends parallel to and spaced from the driving axis 38 (e.g., the second longitudinal axis 74 is radially above the first longitudinal axis 68/driving axis 38 from the frame of reference of FIG. 5). The first and second longitudinal axes 68, 74, respectively, are offset. Accordingly, the storage chamber cylinder 30 is non-concentric with the cylinder 18.

The second longitudinal axis 74 is spaced from the first longitudinal axis 68 by an offset distance H. The offset distance H between the first axis and the second axis is between 5% and 25% of the first diameter D1. In some embodiments, the offset distance H is between 5% and 20% of the first diameter D1. In further embodiments, the offset distance H is between 5% and 15% of the first diameter D1. In yet further embodiments, the offset distance H is between 5% and 10% of the first diameter D1. In the illustrated embodiment, the offset distance H is 7.1% of the first diameter D1.

The non-concentric configuration of the cylinder 18 and the storage chamber cylinder 30 may reduce an overall size of the driver 10, and may facilitate positioning of the driver 10 in tight spaces during use of the driver 10. In addition, this configuration shifts the center of mass of the cylinders

18, 30 closer to the second end 62 where a handle portion 92 of the driver 10 is located (FIGS. 1-3), which may improve the balance and/or handling of the driver 10 while in use. The driver 10 further includes an end cap 78 positioned at the second end 62. The end cap 78 fluidly seals the inner cylinder 18 and the storage chamber cylinder 30 from the outside atmosphere.

Figure 4:
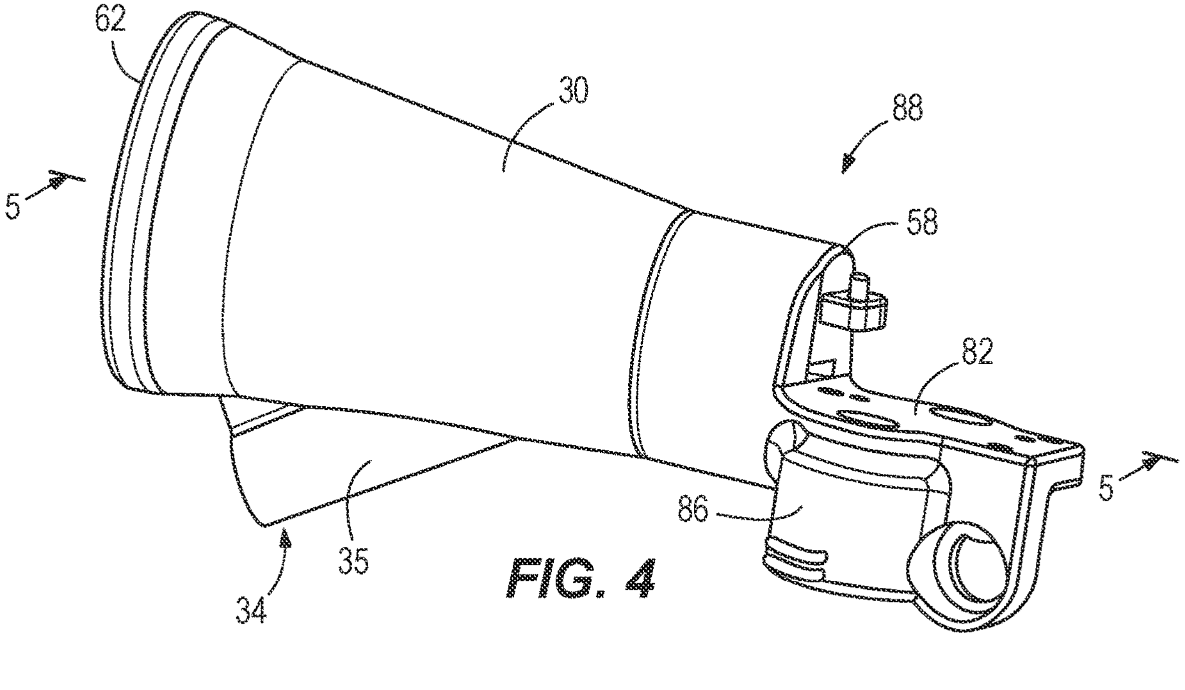
FIG. 4 is a perspective view of the frame assembly of FIG. 3.

With reference to FIGS. 3 and 4, the driver 10 further includes a frame 82 extending from the first end 58 of the storage chamber cylinder 30 away from the second end 62. The frame 82 includes a lifter housing portion 86 positioned proximate the storage chamber cylinder 30 (FIG. 4). The lifter housing portion 86 supports the lifter assembly 42. The frame 82 (including the lifter housing portion 86) is integral with the storage chamber cylinder 30. Additionally, in the illustrated embodiment, the fill valve assembly 34 includes a port 35 (e.g., protrusion) that is also integral with the storage chamber cylinder 30 (FIG. 4). Accordingly, the storage chamber cylinder 30, the frame 82, and the port 35 of the fill valve assembly 34 may be referred to as a frame assembly 88 of the driver 10.

With reference to FIGS. 2-6, the fill valve assembly 34 is located within the handle portion 92. The fill valve assembly 34 includes the port 35, a fill valve 36, and a plug 37. The port 35 extends from the storage chamber cylinder 30 behind the trigger 48 (FIG. 2). In particular, the port 35 of the fill valve assembly 34 extends at an acute angle A (FIG. 5) relative to the second longitudinal axis 74. In the illustrated embodiment, the angle A is between 15 and 65 degrees. In other embodiments, the angle A is between 25 degrees and 55 degrees. In still other embodiments, the angle A is between 35 degrees and 45 degrees. In yet still other embodiments, the angle A is 40 degrees. As such, the fill valve assembly 34 is non-perpendicular to the second longitudinal axis 74 and/or the driving axis 38. This configuration allows positioning the fill valve assembly 34 closer to the trigger 48 to reduce the overall size of the driver 10. The fill valve 36 is positioned within the port 35. An end of the fill valve 36 extends into the storage chamber cylinder 30 between the storage chamber cylinder 30 and the inner cylinder 18. The plug 37 is threaded to an end portion of the port 35. The plug 37 is upstream of the fill valve 36.

With reference to FIG. 1, the driver 10 includes a housing 90 having the handle portion 92, a cylinder support portion 94 in which the storage chamber cylinder 30 is at least partially positioned, and a motor support portion 98 in which the motor 46 and a transmission 102 (FIG. 2) are at least partially positioned. In the illustrated embodiment, the handle portion 92 is integrally formed with the cylinder support portion 94 and the motor support portion 98 as a single piece (e.g., using a casting or molding process, depending on the material used). A power source (e.g., a battery pack 106) is coupled to a battery attachment portion 110 near the end of the handle portion 92. The power source 106 is electrically connectable to the motor 46 for supplying electrical power to the motor 46.

With reference to FIGS. 2-3, the transmission 102, which raises the driver blade 26 from the BDC position toward the TDC position, is operatively coupled to the motor 46. Accordingly, the motor 46 provides torque to the transmission 102 when activated. The transmission 102 further includes an output shaft 112 extending to a lifter 114 of the lifter assembly 42, which is operable to move the driver blade 26 from the BDC position toward the TDC position. In other words, the transmission 102 provides torque to the lifter 114 from the motor 46. The transmission 102 may be configured as a planetary transmission having a multi-stage planetary transmission including any number of planetary stages (e.g., two planetary stages, three planetary stages, etc.). In alternative embodiments, the transmission 102 may be a single-stage planetary transmission.

Figure 9A:
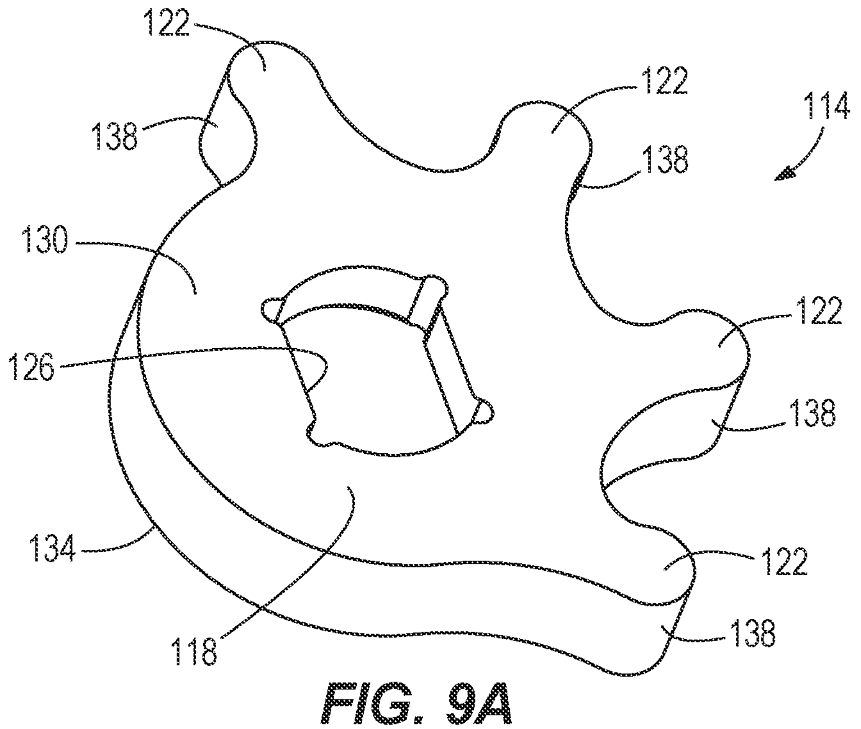
FIG. 9A is a perspective view of the lifter of FIG. 7.
Figure 9B:
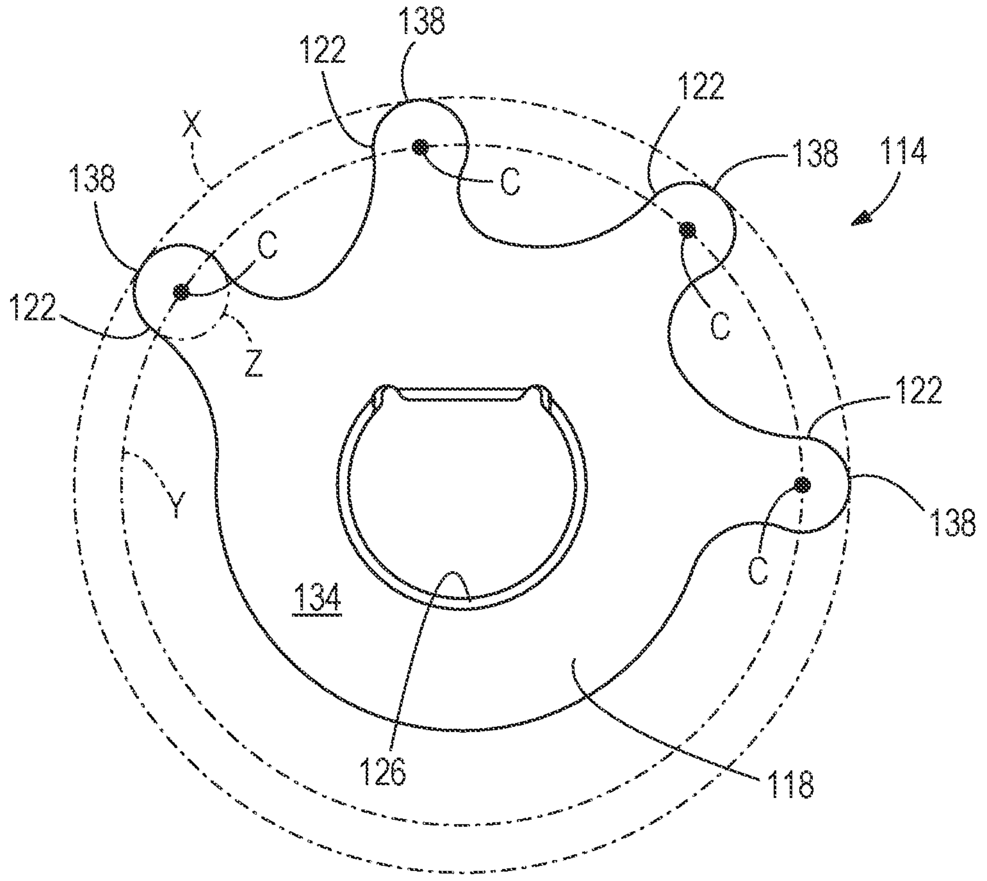
FIG. 9B is a rear view of the lifter of FIG. 7.

With reference to FIGS. 3 and 9A-9B, the lifter 114, which is a component of the lifting assembly 42, is coupled for co-rotation with the transmission output shaft 112 which, in turn, is coupled for co-rotation with the last-stage carrier of the planetary transmission 102 (e.g., such as by a spline-fit arrangement). The lifter 114 includes a hub 118 and a plurality of lugs 122 extending therefrom. The hub 118 includes an opening 126 through which an end of the transmission output shaft 112 extends to rotatably secure the transmission output shaft 112 to the lifter 114. The illustrated lifter 114 includes four lugs 122; however, in other embodiments, the lifter 114 may include three or more lugs 122. The lugs 122 are sequentially engageable with the driver blade 26 to raise the driver blade 26 from the BDC position toward the TDC position.

In the illustrated embodiment, the lifter 114 (e.g., the hub 118 and the lugs 122) is integrally formed as a single piece. In addition, the lifter 114 includes a first side 130 and a second side 134 spaced from the first side 130. The first and second sides 130, 134 are substantially flat. Furthermore, the radially outermost surfaces 138 of the respective lugs 122 are tangent with an imaginary circle X having a first diameter (FIG. 9B). In the illustrated embodiment, the first diameter is between 16.5 millimeters and 24.5 millimeters. In some embodiments, the first diameter is between 18.5 millimeters and 22.5 millimeters. In some embodiments, the first diameter is 20.4 millimeters. The radially outermost surfaces 138 of the respective lugs 122 are also defined by an imaginary circle Z having an origin C, and an imaginary circle Y intersecting the origin C of each of the lugs 122 has a second diameter. The second diameter is less than the first diameter. In the illustrated embodiment, the second diameter is between 14 millimeters and 22 millimeters. In some embodiments, the second diameter is between 16 millimeters and 20 millimeters. In some embodiments, the second diameter is 18 millimeters. Still further, each of the radially outermost surfaces 138 of the respective lugs 122 defined by the imaginary circle Z having an origin C has a third diameter. In the illustrated embodiment, the third diameter is between 1.5 millimeters and 3.5 millimeters. In some embodiments, the third diameter is between 2 millimeters and 3 millimeters. In some embodiments, the third diameter is 2.5 millimeters. The third diameter may be the same or different for one, some, or all of the lugs 122. The predetermined values of each of the first, second, and third diameters may decrease an overall size of the lifter 114, including decreasing the overall size of each lug 122.

Figure 7:
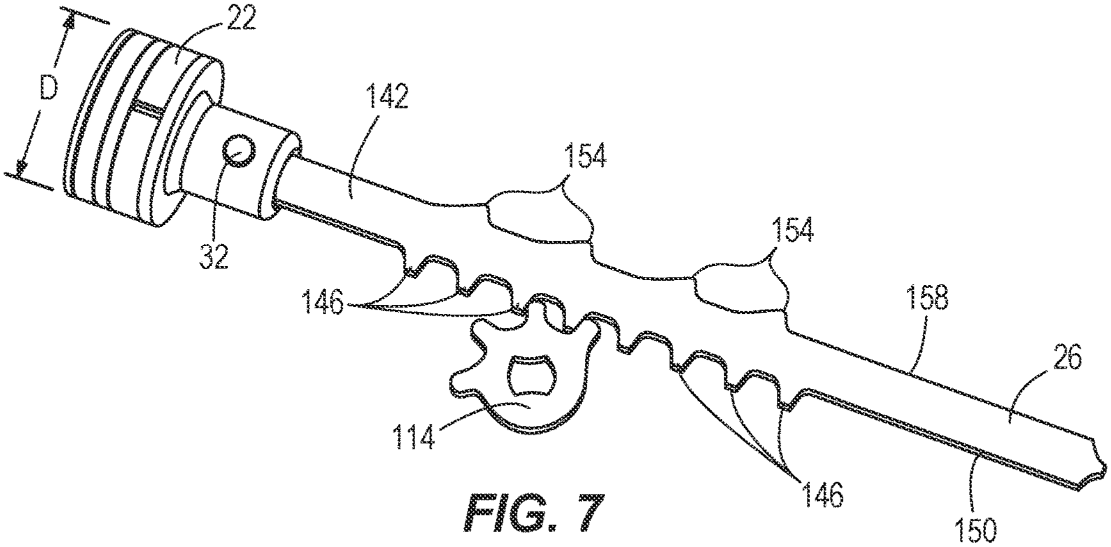
FIG. 7 is a front perspective view of a driver blade coupled to a piston of the powered fastener driver of FIG. 1, and the lifter of FIG. 3.
Figure 8:
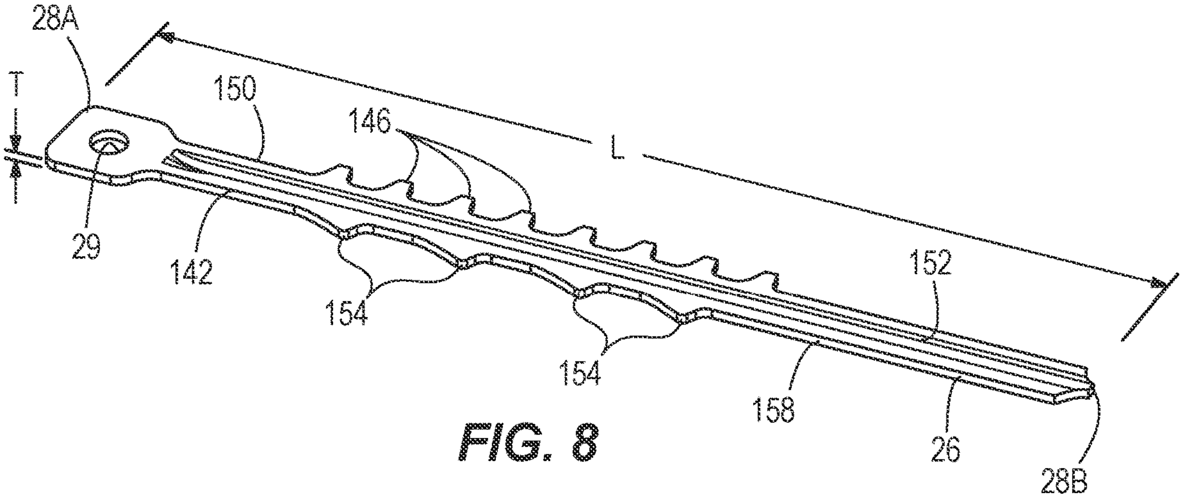
FIG. 8 is a rear perspective view of the driver blade of FIG. 7.

With reference to FIGS. 7 and 8, the driver blade 26 includes a body 142 and a plurality of teeth 146 along the length thereof, and the respective lugs 122 are engageable with the teeth 146 when returning the driver blade 26 from the BDC position toward the TDC position. The teeth 146 extend from a first side 150 of the driver blade 26. The illustrated driver blade 26 includes eight teeth 146, such that two complete revolutions of the lifter 114 moves the driver blade 26 from the BDC position to the TDC position (with stopping at the intermediate "ready" position just short of TDC). The reduced size lifter 114 may allow for the size of the teeth 146 to also be reduced.

With reference to FIGS. 7 and 8, the driver blade 26 includes a length L extending between a first end 28A a second end 28B of the driver blade 26. In the illustrated embodiment, the length L is between 110 millimeters and 130 millimeters. In some embodiments, the length L is between 115 millimeters and 125 millimeters. In some embodiments, the length L is 120.5 millimeters. The body 142 of the driver blade 26 further includes a thickness T. In the illustrated embodiment, the thickness T is between 1.00 millimeters and 1.30 millimeters. In some embodiments, the thickness T is between 1.10 millimeters and 1.20 millimeters. In some embodiments, the thickness T is 1.15 millimeters. Still further, the piston 22 has a diameter D. In the illustrated embodiment, the diameter D is between 16 millimeters and 28 millimeters. In some embodiments, the diameter D is between 19 millimeters and 25 millimeters. In some embodiments, the diameter D is 21.9 millimeters.

The illustrated driver blade 26 is coupled to the piston 22 by a pinned connection. In the illustrated embodiment, the driver blade 26 includes an opening 29 positioned proximate the first end 28A (FIG. 8). The opening 29 is aligned with an opening in the piston 22. A pin 32 extends through the opening of the piston 22 and the opening 29 of the driver blade 26 for coupling the piston 22 and the driver blade 26 together.

Figure 12:
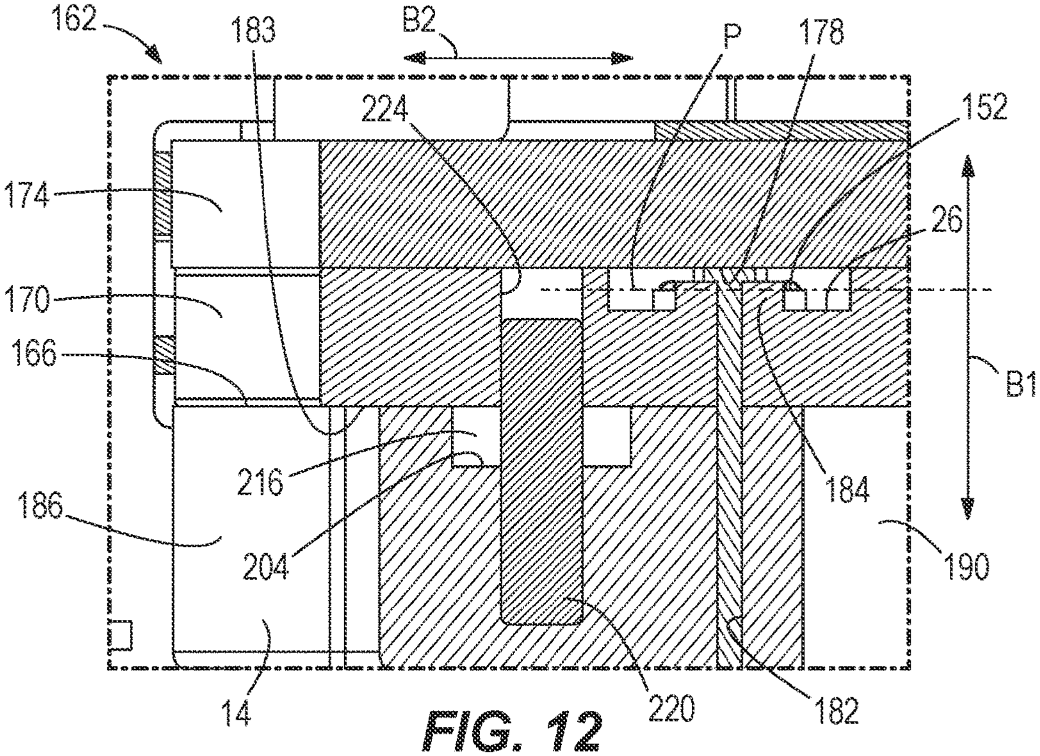
FIG. 12 is a partial cross-sectional view of the nosepiece and the magazine taken along line 12-12 in FIG. 10, illustrating a nosepiece base coupled to a nosepiece cover of the nosepiece.

The driver blade 26 further includes axially spaced projections 154, the purpose of which is described below, formed on a second side 158 of the body 142 opposite the teeth 146. The illustrated driver blade 26 is manufactured such that the body 142, each of the teeth 146, and each of the projections 154 are bisected by a common plane P (FIG. 12). In addition, each of the teeth 146 and the projections 154 have the same thickness as the thickness T of the body 142 of the driver blade 26. This may allow the driver blade 26 to be made using a stamping operation, thus simplifying the manufacturing process, and eliminating potential stress risers between transitions in thickness that might otherwise exist between the driver blade 26, the teeth 146, and the projections 154.

The driver 10 further includes a latch assembly (not shown) having a pawl or latch for selectively holding the driver blade 26 in the ready position, and a solenoid for releasing the latch from the driver blade 26. In other words, the latch assembly is moveable between a latched state in which the driver blade 26 is held in the ready position against a biasing force (i.e., the pressurized gas in the storage chamber cylinder 30), and a released state in which the driver blade 26 is permitted to be driven by the biasing force from the ready position to the driven position. The latch assembly is positioned proximate the second side 158 of the driver blade 26.

The latch is moveable between a latched position (coinciding with the latched state of the latch assembly) in which the latch is engaged with one of the projections 154 on the driver blade 26 for holding the driver blade 26 in the ready position against the biasing force of the compressed gas, and a released position (coinciding with the released state of the latch assembly) in which the driver blade 26 is permitted to be driven by the biasing force of the compressed gas from the ready position to the driven position.

With reference to FIGS. 2 and 10-12, the driver 10 further includes a nosepiece 162 supported by the frame 82. In addition, the nosepiece 162 is positioned at a front end 166 (FIG. 11) of the magazine 14. The nosepiece 162 includes a nosepiece base 170 and a nosepiece cover 174 coupled to the nosepiece base 170. The illustrated nosepiece base 170 is integrally formed with the frame 82 as a single piece. The nosepiece base 170 and the nosepiece cover 174 form a firing channel 178 therebetween (FIG. 12). The magazine 14 includes a fastener channel 182 along a length thereof. The firing channel 178 is in communication with the fastener channel 182. The firing channel 178 is configured to consecutively receive fasteners from a collated fastener strip stored in the fastener channel 182 of the magazine 14. The firing channel 178 is aligned with the driving axis 38 of the driver blade 26. In the illustrated embodiment, the nosepiece base 170 includes a surface 183 (i.e., bottom surface from the frame of reference of FIG. 12). The surface 183 is positioned adjacent to and coupled to the front end 166 of the magazine 14.

With reference to FIGS. 8 and 12, the illustrated driver blade 26 includes a slot 152 extending along the driving axis 38. The slot 152 is configured to receive a rib 184 (FIG. 12) extending from the nosepiece 162 (i.e., the nosepiece base 170). The slot 152 and the rib 184 is configured to facilitate movement of the driver blade 26 along the driving axis 38 and inhibit movement of the driver blade 26 off-axis. (i.e., left or right from the frame of reference in FIG. 12.). In some embodiments, the driver blade 26 may include the rib 184 and the nosepiece 162 may include the slot 152.

Figure 11:
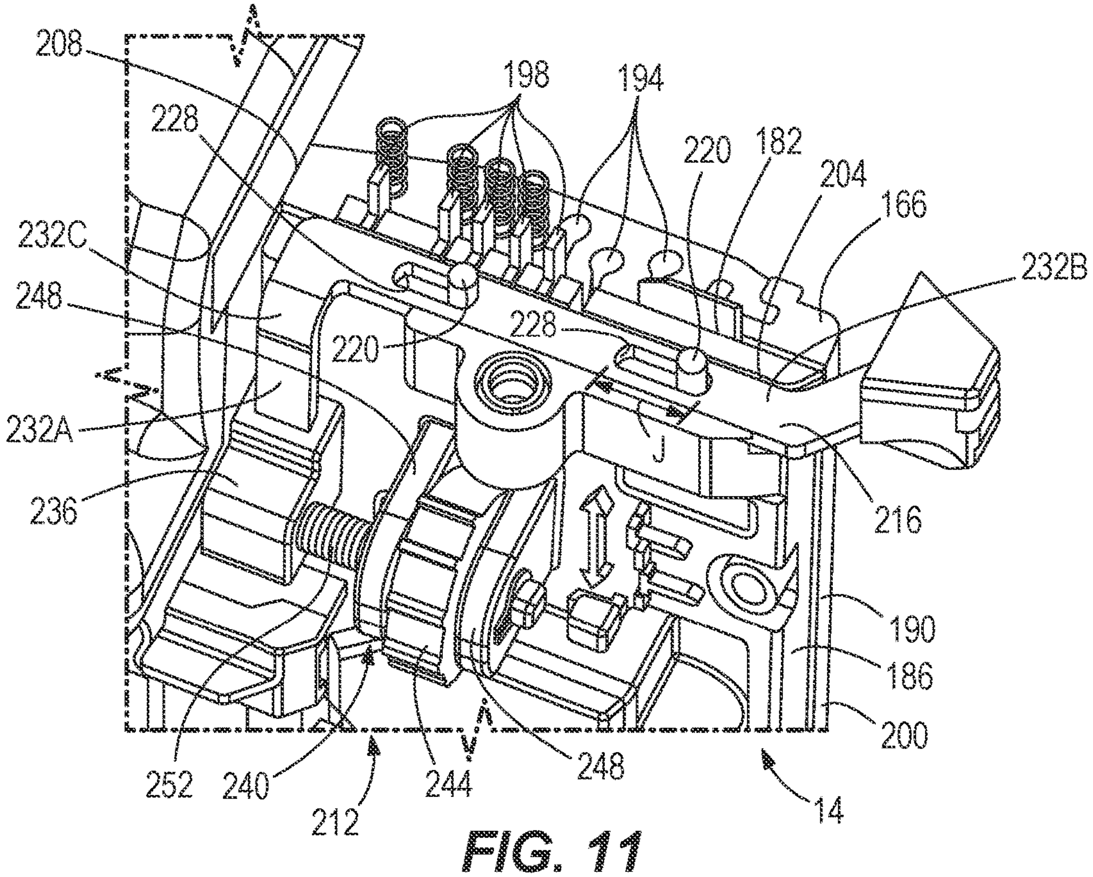
FIG. 11 is another front perspective view of the end of the magazine of FIG. 10 with the nosepiece removed, illustrating a workpiece contact element of the powered fastener driver of FIG. 1.
Figure 13:
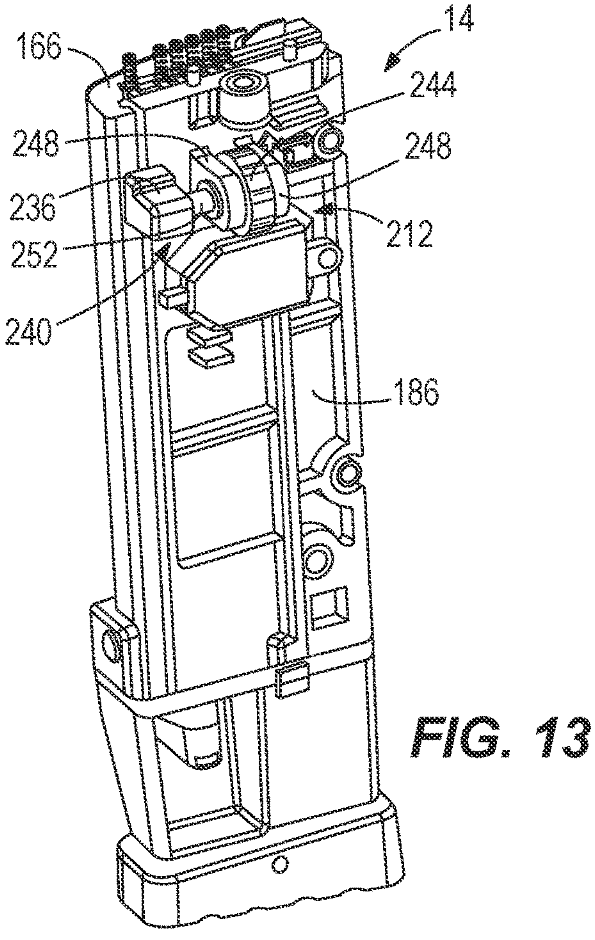
FIG. 13 is a first side perspective view of the magazine of the powered fastener driver of FIG. 1.
Figure 14:
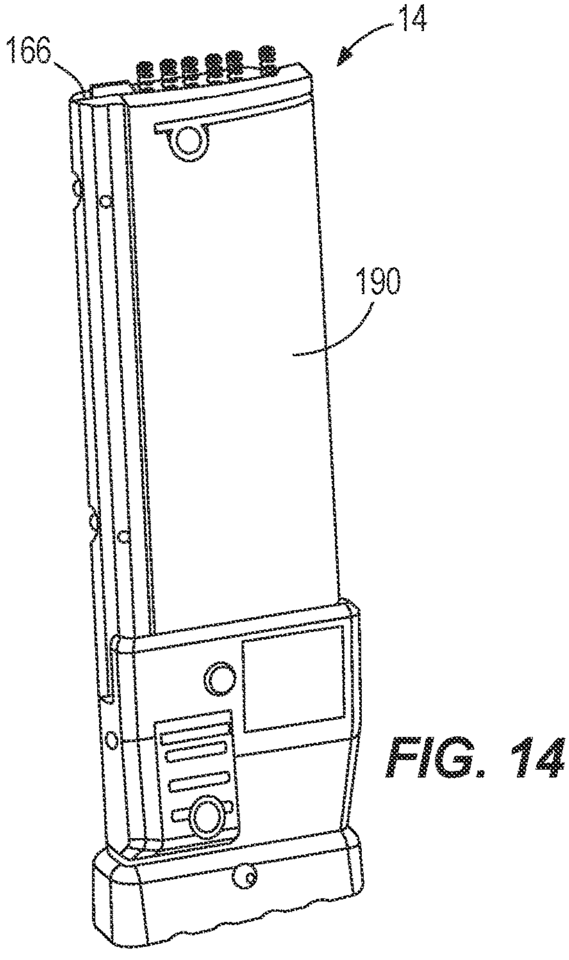
FIG. 14 is a second side perspective view of the magazine of the powered fastener driver of FIG. 1.
Figure 15:
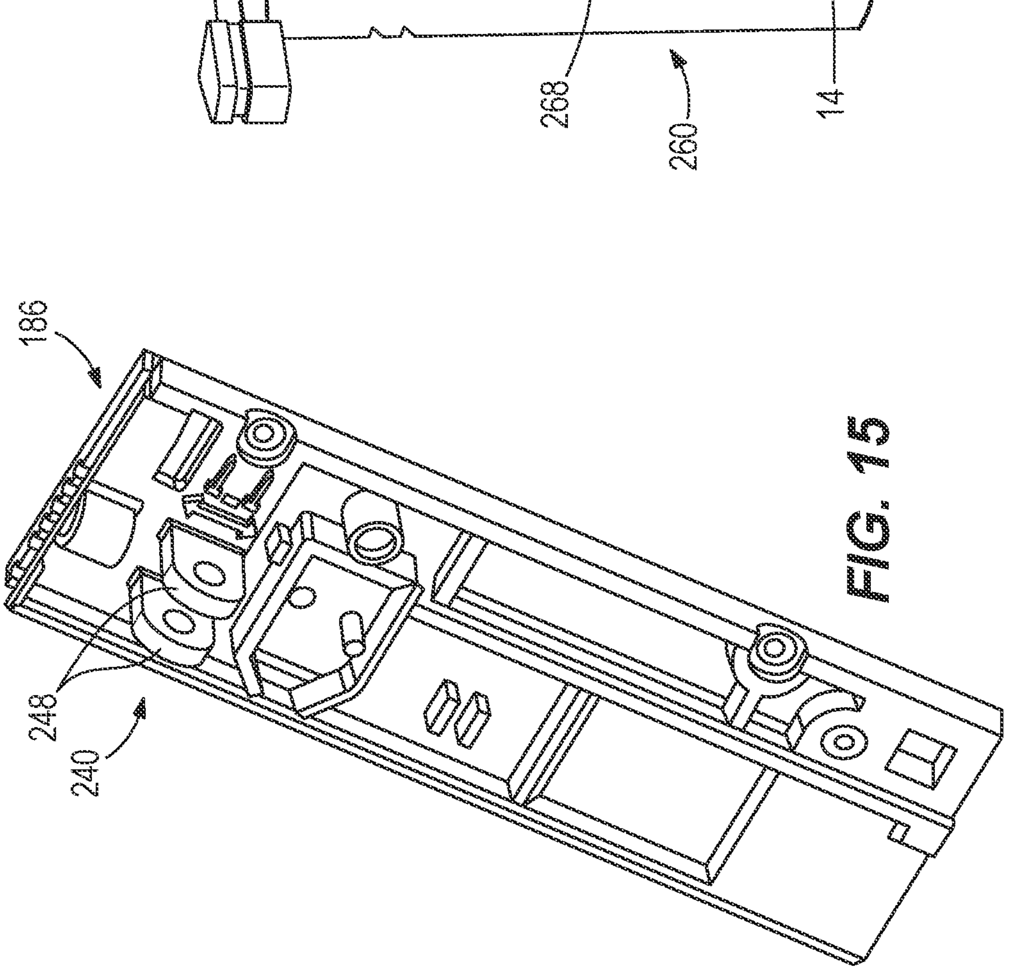
FIG. 15 is a side perspective view of a portion of the magazine of FIG. 13.
Figure 27:
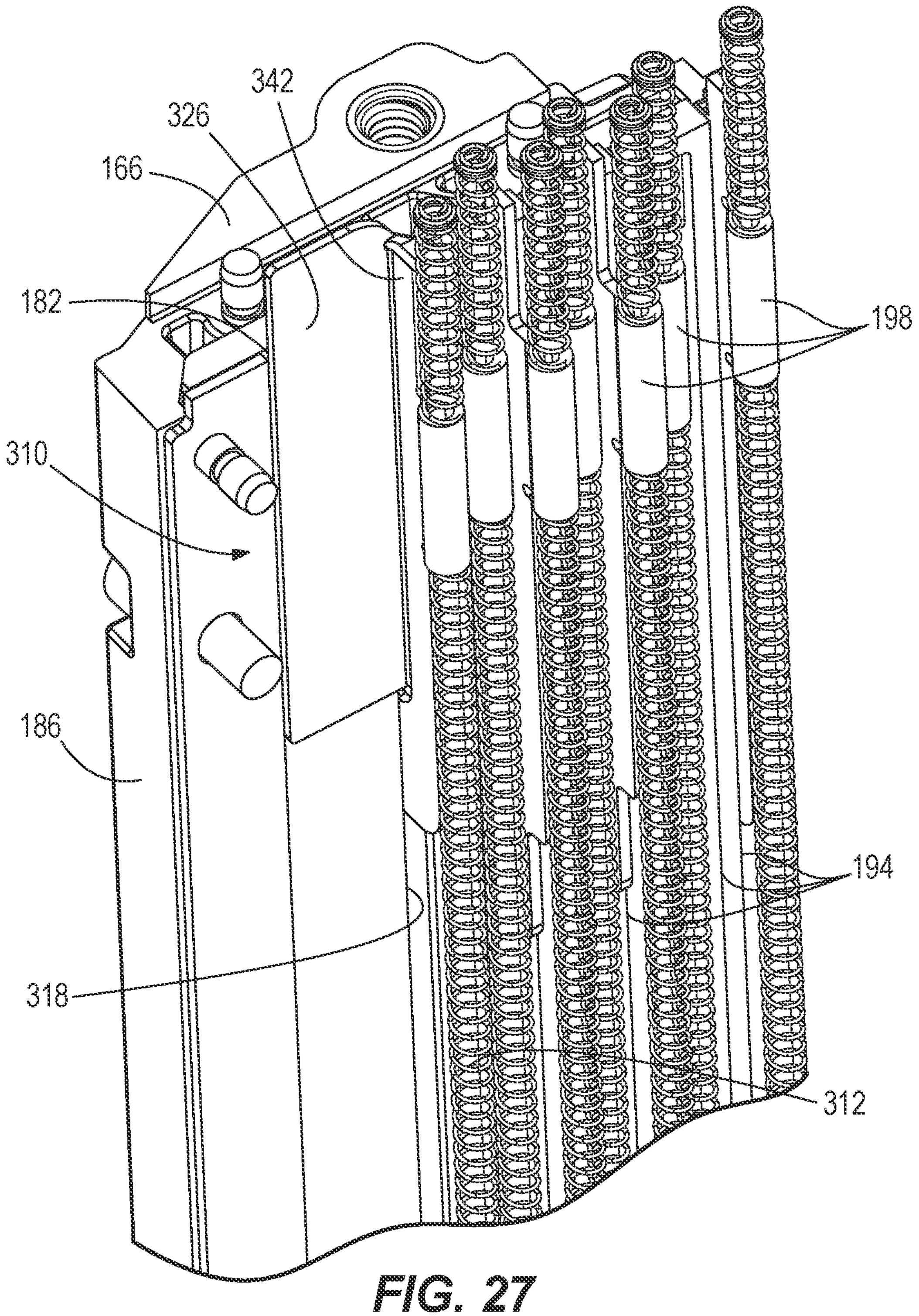
FIG. 27 is a perspective view of a portion of the magazine of FIG. 13 illustrating a pusher assembly.

With reference to FIGS. 13-15, the magazine 14 includes a base portion 186 and a cover portion 190. The base portion 186 is fixedly coupled to the nosepiece base 170. The cover portion 190 is slidably coupled to the base portion 186 (i.e., such as for re-loading). Additionally, the base portion 186 and the cover portion 190 cooperatively define a plurality of slots 194 configured to receive a plurality of guide pins 198 (FIG. 11). The slots 194 including the guide pins 198 are positioned at specific heights relative to a bottom edge 200 (FIG. 11) of the magazine 14, which correspond with common lengths of the fasteners. The fastener channel 182 of the magazine 14 is configured to receive a pusher assembly 310 (FIG. 27) configured to bias (e.g., by spring 312) the fasteners within the fastener channel 182 toward the nosepiece base 170. Additionally, each guide pin 198 is slidable within the fastener channel 182 with the movement of the pusher assembly 310 toward the nosepiece base 170.

Furthermore, with reference to FIGS. 11-12, the magazine 14 includes a slot 204 defined in the front end 166 of the magazine 14. More specifically, in the illustrated embodiment, the base portion 186 defines the slot 204. The slot 204 extends through the base portion 186 from the bottom edge 200 to proximate a top edge 208 (FIG. 11) opposite the bottom edge 200. The illustrated slot 204 is linear. With particular reference to FIG. 12, the slot 204 is positioned adjacent to the fastener channel 182 in the magazine 14. In addition, the slot 204 is parallel with the firing channel 178.

The base portion 186 is formed from a first material, and the cover portion 190 is formed from a second material. In the illustrated embodiment, the first material is different than the second material. Additionally, the first material has a first hardness, and the second material has a second hardness. The hardness of the first material is less than a hardness of the second material. For example, in the illustrated embodiment, the first material is formed from plastic, and the second material is formed from aluminum.

Figure 10:
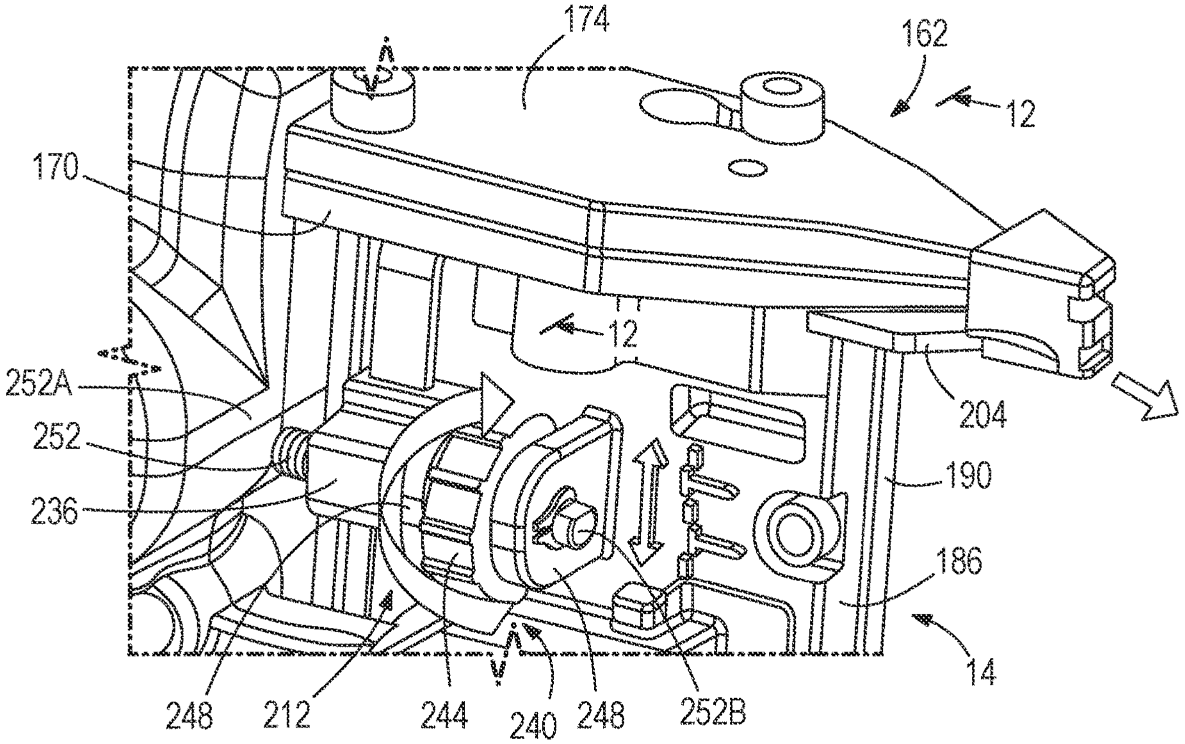
FIG. 10 is a front perspective view of a nosepiece coupled to an end of a magazine of the powered fastener driver of FIG. 1, illustrating a depth of drive adjustment assembly positioned on the magazine.

With reference to FIGS. 10-11, the fastener driver 10 further includes a depth of drive adjustment assembly 212 including a workpiece contact element 216. The workpiece contact element 216 is movable with respect to the nosepiece 162 and the magazine 14. The workpiece contact element 216 is at least partially received within the slot 204 within the base portion 186 of the magazine 14. In the illustrated embodiment, the workpiece contact element 216 is positioned within the slot 204, and the nosepiece base 170 covers the slot 204. In other words, the workpiece contact element 216 is positioned and constrained between the base portion 186 of the magazine 14 and the nosepiece base 170 of the nosepiece 162. This may reduce undesirable movement of the workpiece contact element 216 in a first direction B1 perpendicular to the driving axis 38 (i.e., the vertical direction from the frame of reference of FIG. 12). The workpiece contact element 216 is supported by the magazine 14 (i.e., the base portion 186). And, the workpiece contact element 216 extends in the direction of the driving axis 38, or generally parallel with the driving axis 38, which is also parallel with the slot 204 (FIG. 11).

The workpiece contact element 216 is movable relative to the nosepiece 162 between an extended position and a retracted position. More specifically, the movement of the workpiece contact element 216 relative to the nosepiece 162 is guided by the slot 204. A spring (not shown) is configured to bias the workpiece contact element 216 toward the extended position. The workpiece contact element 216 is configured to be moved from the extended position toward the retracted position when the workpiece contact element 216 is pressed against a workpiece.

The illustrated base portion 186 of the magazine 14 further includes a plurality of pins 220 extending from the base portion 186 into the slot 204 (FIG. 11). And, the nosepiece base 170 includes a plurality of openings 224, each of which is in facing relationship with the respective pin 220 (FIG. 12). Each opening 224 is configured to receive an end portion of one of the pins 220 such that each pin 220 extends between the base portion 186 of the magazine 14 and the nosepiece base 170. The workpiece contact element 216 (positioned between the base portion 186 and the nosepiece base 170) includes a plurality of guide channels 228 configured to receive the respective pins 220 (FIG. 11). In the illustrated embodiment, the base portion 186 includes two pins 220, and the workpiece contact element 216 includes two channels 228. In other embodiments, the base portion 186 and the workpiece contact element 216 may include one or more pins 220 and associated guide channels 228. This may reduce undesirable movement of the workpiece contact element 216 in a second direction B2 perpendicular to the driving axis 38 (i.e., the horizontal direction from the frame of reference of FIG. 12). Still further, in other embodiments, the magazine 14 may include the one or more guide channels, and the workpiece contact element 216 may include the associated one or more pins.

Each channel 228 has a length J (FIG. 11) extending between opposite ends of the respective channel 228. Each of the channels 228 has the same length J. The length J of the channel 228 limits the movement of the workpiece contact element 216 between the extended position and the retracted position.

With particular reference to FIG. 11, the workpiece contact element 216 includes a plurality of sections 232A-232C. In the illustrated embodiment, the workpiece contact element 216 includes a first, planar section 232A and a second, planar section 232B coupled to the first section 232A by a rounded section 232C. The second section 232B includes the guide channels 228 and is slidably received in the slot 204. A mounting block 236 is attached to an end of the first section 232A to secure the workpiece contact element 216 to the remaining portions of the depth of drive adjustment assembly 212.

With reference to FIG. 10, the depth of drive adjustment assembly 212 includes a support member or bracket 240, an adjustment knob 244, and a screw portion 252. The magazine 14 includes the bracket 240. In the illustrated embodiment, the bracket 240 is integrally formed with the base portion 186 of the magazine 14 as a single piece. For example, the bracket 240 is integrally molded with the base portion 186. The illustrated bracket 240 includes first and second flanges 248. The adjustment knob 244 is positioned between the first and second flanges 248. The adjustment knob 244 is rotatably supported upon the bracket 240. One end 252A of the screw portion 252 is threadably coupled to the mounting block 236 of the workpiece contact element 216, and another opposite end 252B of the screw portion 252 is rotatably supported by the flanges 248. Furthermore, the screw portion 252 is coupled for co-rotation with the adjustment knob 244. Accordingly, the screw portion 252 and the knob 244 are rotatably supported by the first and second flanges 248 of the bracket 240. Rotation of the adjustment knob 244 axially threads the mounting block 236 along the screw portion 252 for adjusting a protruding length of the workpiece contact element 216 relative to the distal end of the nosepiece 162. As such, the adjustment knob 244 may be termed as an actuator.

The depth of drive adjustment assembly 212 adjusts the depth to which a fastener is driven into the workpiece. In particular, the depth of drive adjustment assembly 212 adjusts the length that the workpiece contact element 216 protrudes relative to the distal end of the nosepiece 162, thereby changing the distance between the distal end of the nosepiece 162 and the workpiece contact element 216 in the extended position. In other words, the depth of drive adjustment assembly 212 adjusts how far the workpiece contact element 216 extends past the nosepiece 162 for abutting with a workpiece. The larger the gap between the distal end of the nosepiece 162 and the workpiece, the shallower the depth a fastener will be driven into the workpiece. As such, the position of the workpiece contact element 216 with respect to the nosepiece 162 is adjustable to adjust the depth to which a fastener is driven.

Figure 16:
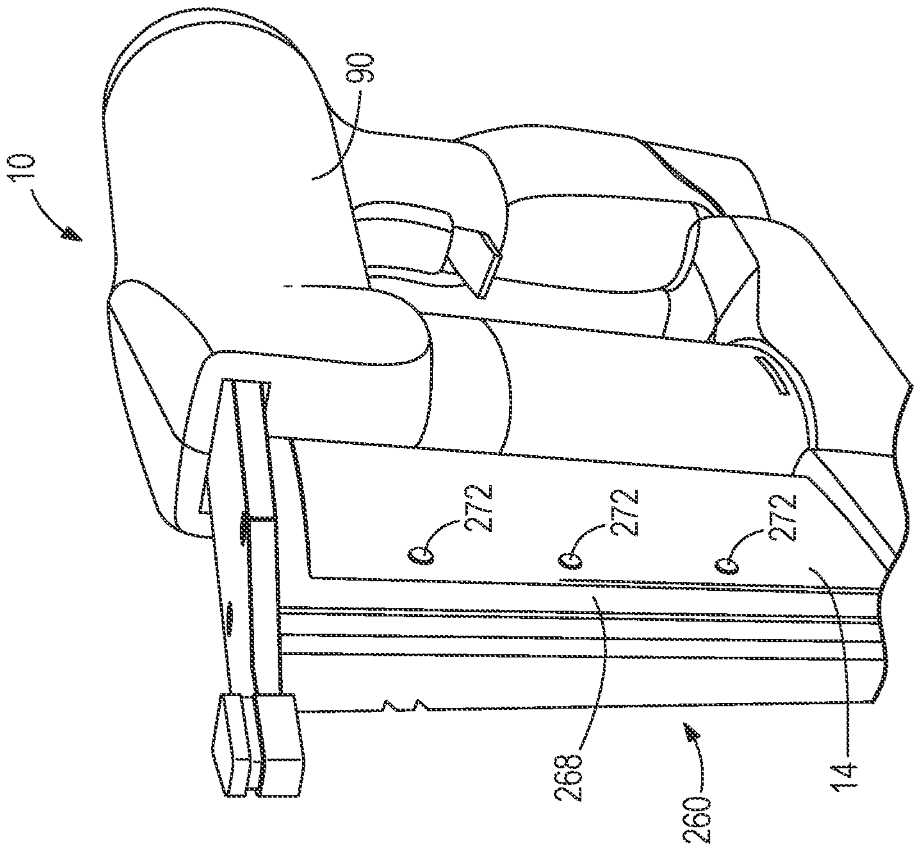
FIG. 16 is a side perspective view of the powered fastener driver of FIG. 1, illustrating an onboard nail storage system.
Figure 18:
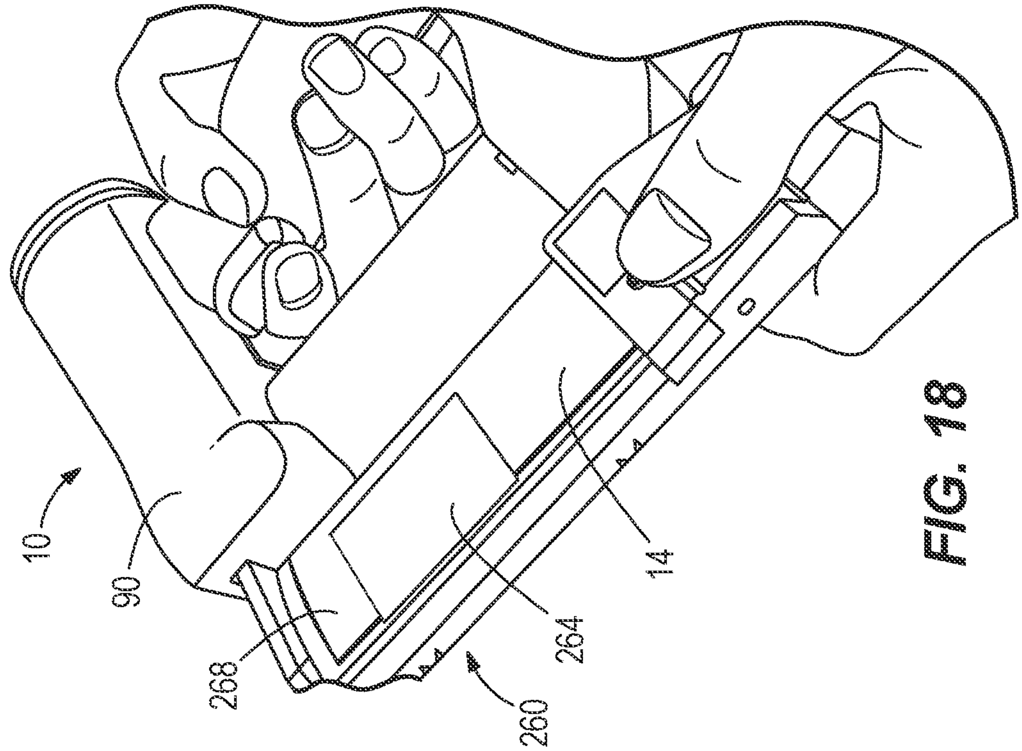
FIG. 18 is yet another side perspective view of the powered fastener driver of FIG. 17.
Figure 17:
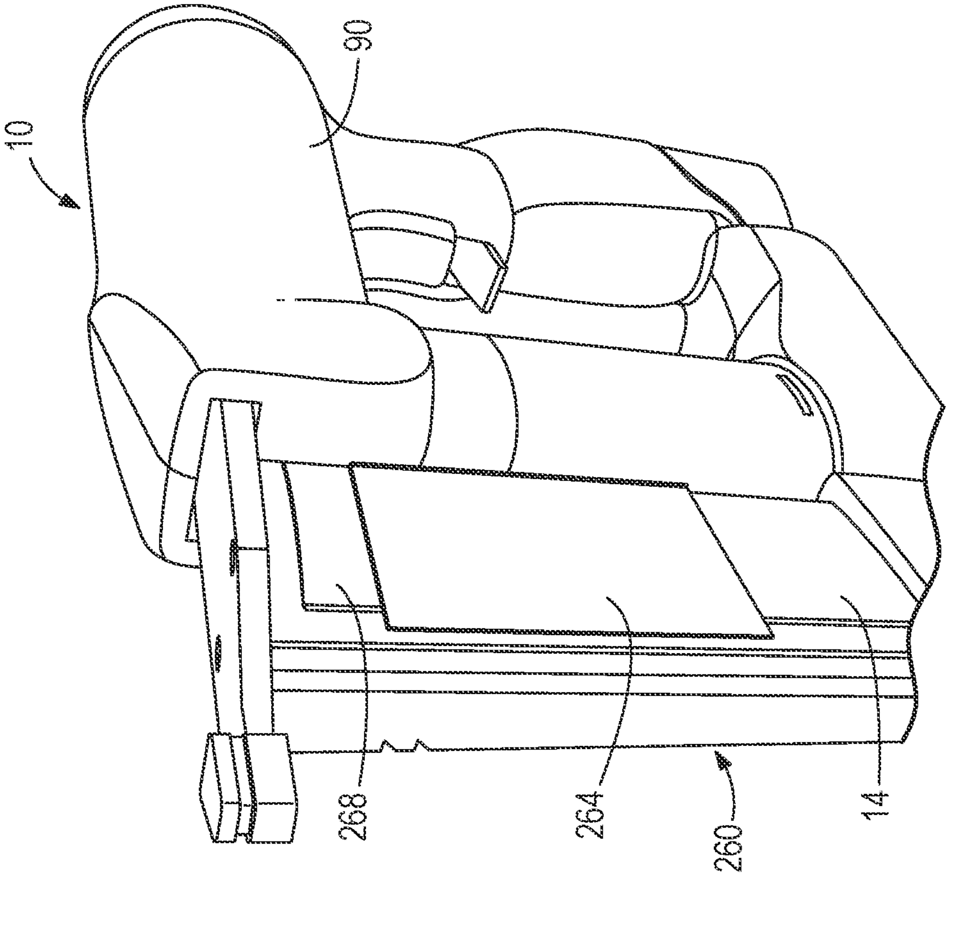
FIG. 17 is another side perspective view of the powered fastener driver of FIG. 16, illustrating a secondary collated fastener strip coupled to the onboard nail storage system.

With reference to FIGS. 16-18, the magazine 14 further includes an onboard nail storage system 260 for holding a secondary collated fastener strip 264 (shown schematically in FIG. 17) to be loaded into the fastener channel 182 after a primary collated fastener strip has been emptied from the fastener channel 182. The onboard nail storage system 260 is positioned on an outer surface 268 of the magazine 14 (i.e., the base portion 186 and/or the cover portion 190). In the illustrated embodiment, the onboard nail storage system 260 includes a plurality of magnetic elements 272 (FIG. 16). Each magnetic element 272 is spaced from each other on the outer surface 268 of the magazine 14. In the illustrated embodiment, the onboard nail storage system 260 includes three magnetic elements 272. However, in other embodiments, the onboard nail storage system 260 may include one or more magnetic elements 272 (e.g., two, four, etc.). The magnetic elements 272 are configured to magnetically latch the secondary collated fastener strip 264 to the magazine 14. Still further, in some embodiments, the magnetic elements 272 may be configured such that multiple secondary collated fastener strips 264 can be stacked, one on top of another, on the magazine 14. A user may remove the secondary collated fastener strip 264 from the magazine 14 and load it into the fastener channel 182 after the primary collated fastener strip has been emptied from the magazine 14.

FIGS. 19-23 illustrate an alternative lifter 114' and driver blade 26' of the powered fastener driver 10 according to another embodiment of the invention, with like components and features as the first embodiment of the lifter 114 and driver blade 26 of the powered fastener driver 10 shown in FIGS. 7-9B being labeled with like reference numerals plus a prime symbol "'". The lifter 114' and driver blade 26' is adapted for use with the powered fastener driver 10 of FIGS. 1-18 and, accordingly, the discussion of the powered fastener driver 10 above similarly applies to the lifter 114' and driver blade 26' and is not re-stated. In addition, only differences between the lifter 114 and driver blade 26 of FIGS. 7-9B and the lifter 114' and driver blade 26' of FIGS. 19-23 are specifically noted herein.

Figure 19:
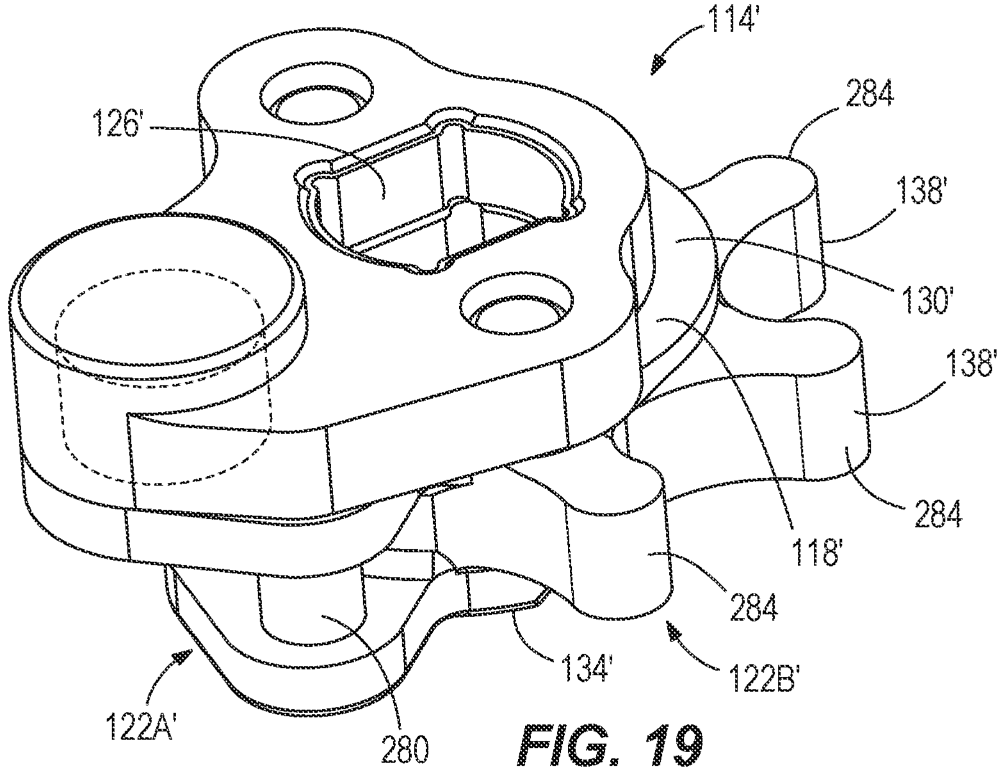
FIG. 19 is a perspective view of another lifter for use with the powered fastener driver of FIG. 1.
Figure 20:
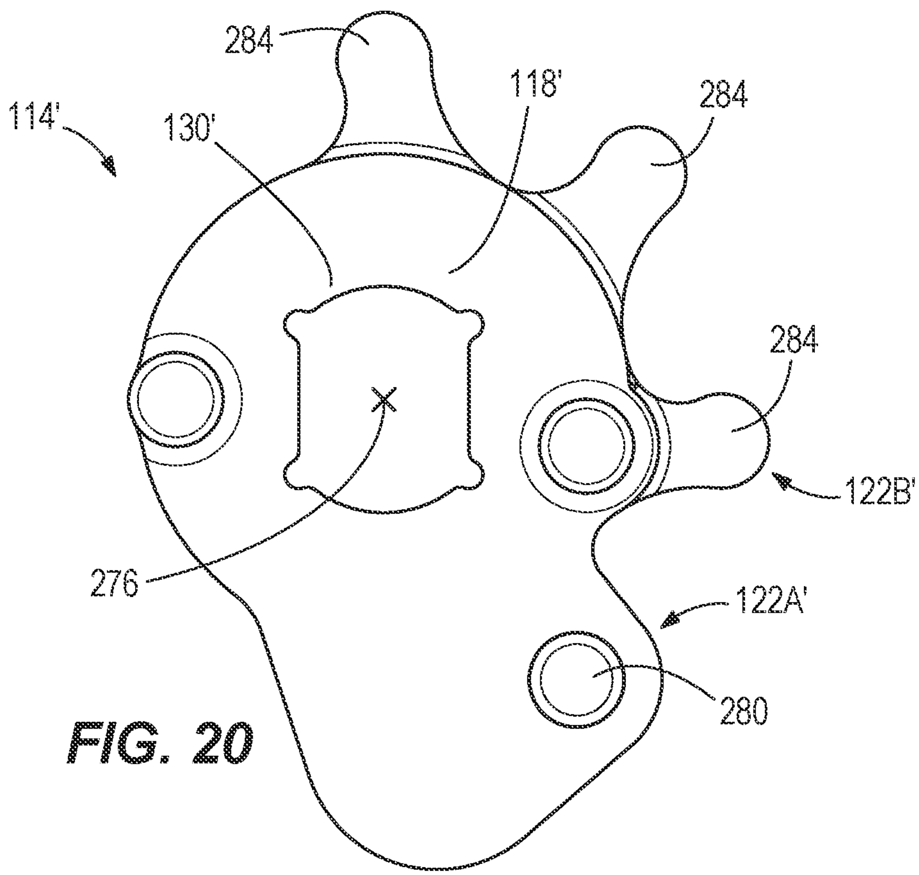
FIG. 20 is a front view of a portion of the lifter of FIG. 19.

With reference to FIGS. 19 and 20, the lifter 114' includes a first, rolling type of lugs 122A' and a second, stationary type of lugs 122B'. The lugs 122A', 122B' are arranged about a rotational axis 276 (FIG. 20) of the hub 118' of the lifter 114'. The first type of lugs 122A' includes a pin 280 configured to rotatably support a roller (not shown) that is rotatable relative to the hub 118'. In other embodiments, the pin 280 itself may be rotatable relative to the hub 118'. The roller/pin 280 is configured to facilitate rolling motion between the roller/pin 280 and the drive blade 26, 26' when raising the driver blade 26, 26' from the BDC position toward the TDC position. This may inhibit or reduce wear on the lug 122A'. The second type of lug 122B' includes a stationary driving projection 284 extending from the hub 118' of the lifter 114'. The driving projection 284 is integral with or secured to the hub 118' such that the driving projection 284 is fixed relative to the hub 118'. In the illustrated embodiment, the lifter 114' includes one roller/pin 280 and three stationary driving projections 284. In other embodiments, the lifter 114' may include one or more rollers/pins 280 (e.g., two, three, etc.), and one or more stationary driving projections 284 (e.g., two, four, etc.). The first, rolling type of lugs 122A' (e.g., the roller/pin 280) may be formed from a different material that has a hardness greater than a material forming the second, stationary type of lugs 122B'. This may further inhibit or reduce wear.

Figure 21:
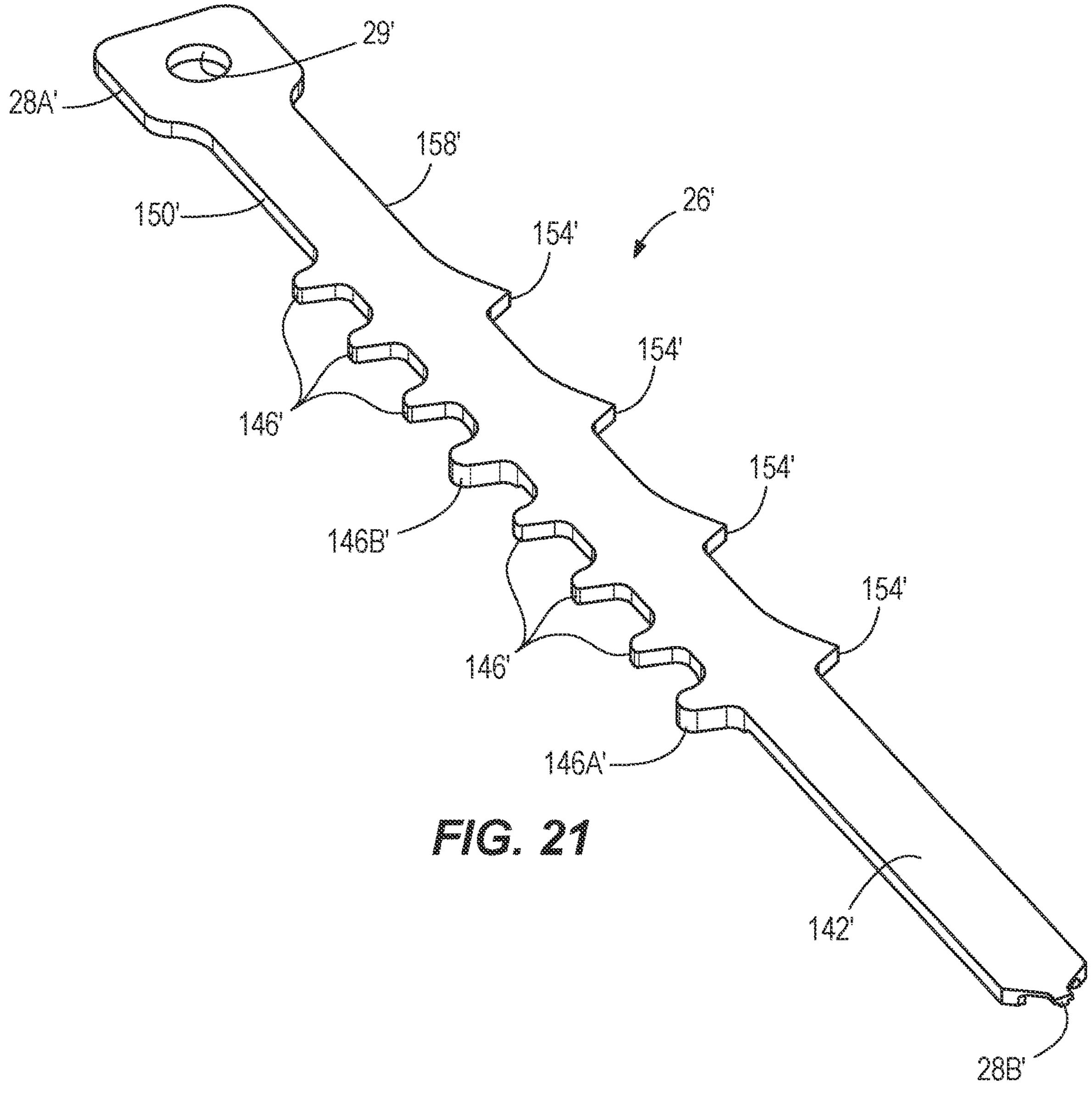
FIG. 21 is a perspective view of another driver blade for use with the powered fastener driver of FIG. 1.
Figure 22:
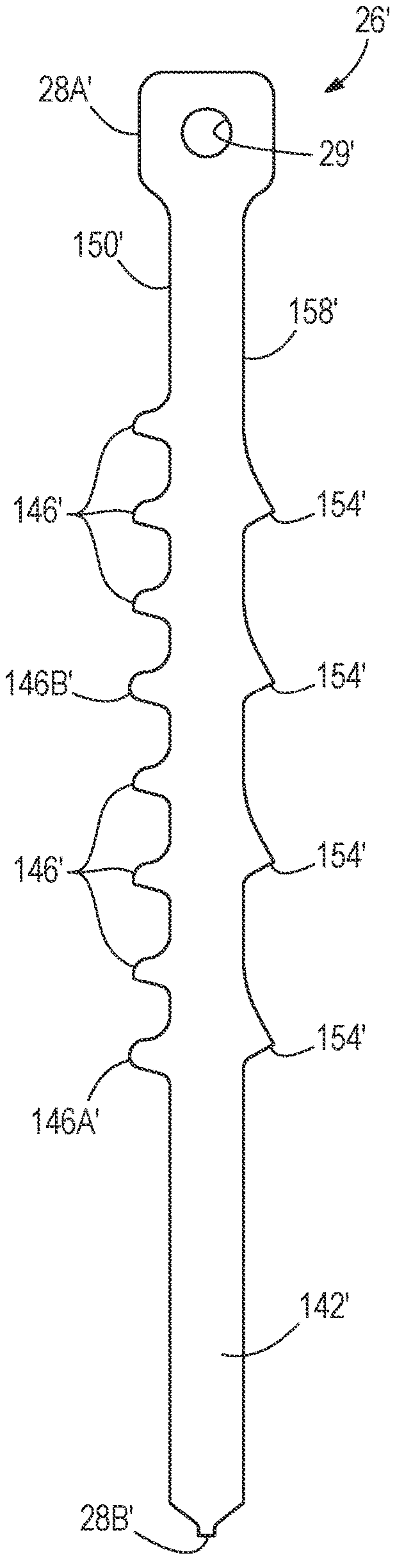
FIG. 22 is a front view of the driver blade of FIG. 21.
Figure 23:
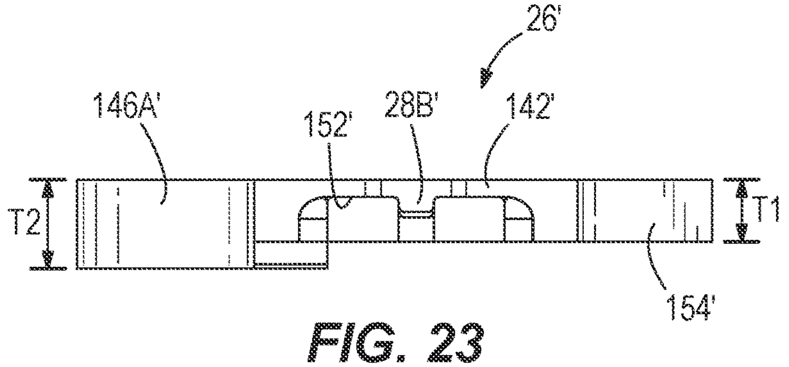
FIG. 23 is a bottom view of the driver blade of FIG. 21.

With reference to FIGS. 21-23, the drive blade 26' includes the elongated body 142' having a plurality of teeth 146' extending from the first side 150' and a plurality of projections 154' extending from the second side 158' of the body 142'. As shown in FIG. 23, unlike the first embodiment of the driver blade 26 of FIGS. 7A-7B, the body 142' of the driver blade 26' has a first thickness T1, and one of the teeth 146' and/or one of the projections 154' has a second thickness T2 that is greater than the first thickness T1. For example, in the illustrated embodiment, a lower-most tooth 146A' of the teeth 146' has the second thickness T2. Accordingly, a thickness of a select one of the teeth 146' and/or one of the projections 154' may be increased to create a stepped configuration with respect to the body 142' of the drive blade 26' from the frame of reference of FIG. 23. The increased thickness may inhibit or reduce wear to the select one of the teeth 146' and/or the one of the projections 154', and/or or may reduce contact stress to the select one of the teeth 146' and/or the one of the projections 154'. In some embodiments, more than one of the teeth 146' and/or more than one of the projections 154' has the second thickness T2. For example, as shown in FIG. 21, in the illustrated embodiment, two of the teeth 146A', 146B' have the second thickness T2. A mass of the driver blade 26' may be minimized by only increasing the thickness of the select one of the teeth 146' and/or the one of the projections 154', rather than increasing a thickness of the entire driver blade 26'.

Figure 24:
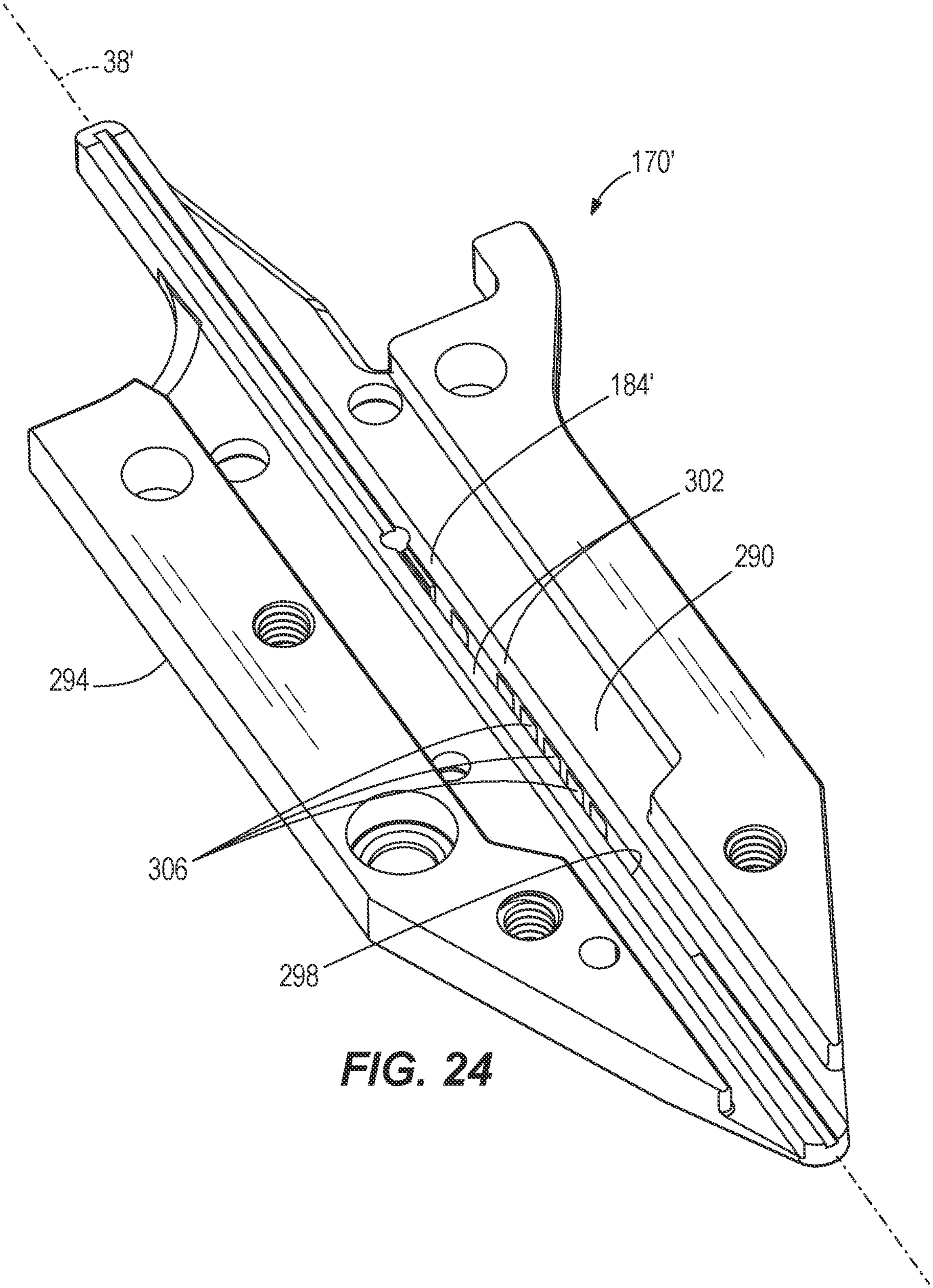
FIG. 24 is a front perspective view of another nosepiece base for use with the powered fastener driver of FIG. 1.
Figure 25:
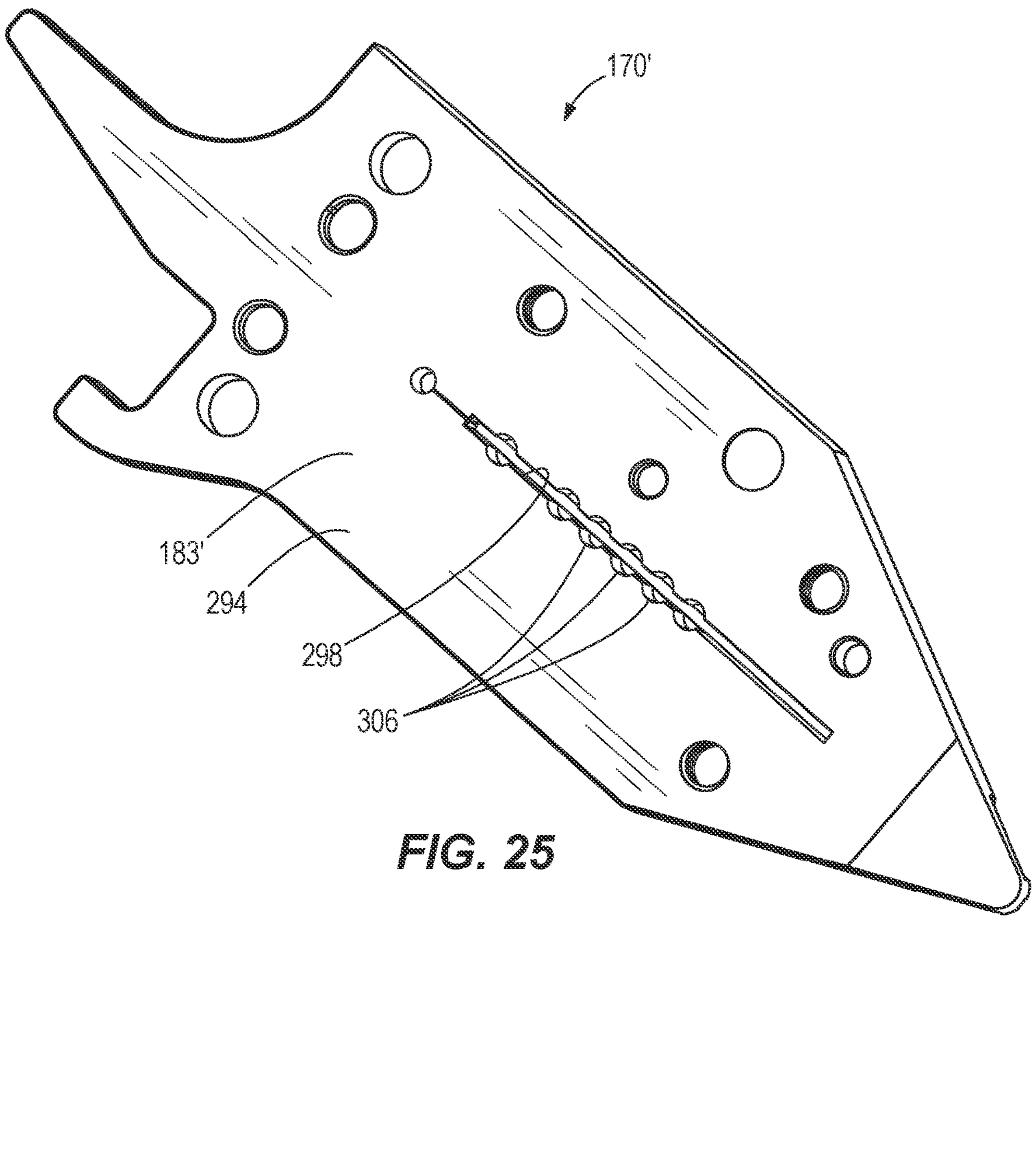
FIG. 25 is a bottom perspective view of the nosepiece base of FIG. 24.
Figure 26:
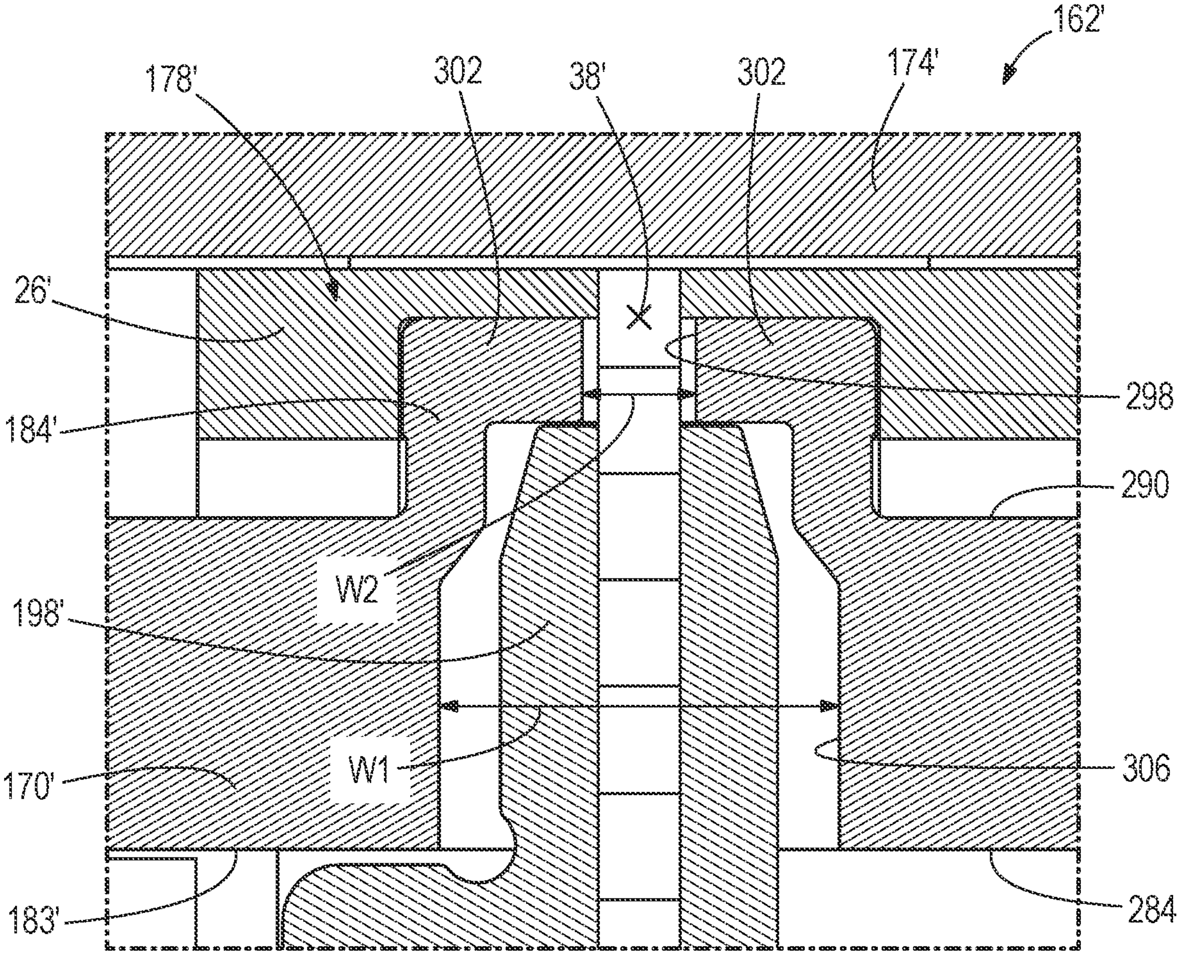
FIG. 26 is a cross-sectional view of the powered fastener driver of FIG. 1 with the nosepiece base of FIG. 24.

FIGS. 24-26 illustrate an alternative nosepiece base 170' of the nosepiece 162' of the powered fastener driver 10 according to another embodiment of the invention, with like components and features as the first embodiment of the nosepiece base 170 of the nosepiece 162 of the powered fastener driver 10 shown in FIGS. 10-12 being labeled with like reference numerals plus a prime symbol “'”. The nosepiece base 170' is adapted for use with the powered fastener driver 10 of FIGS. 1-18 and, accordingly, the discussion of the powered fastener driver 10 above similarly applies to the nosepiece base 170' and is not re-stated. In addition, only differences between the nosepiece base 170 of FIGS. 10-12 and the nosepiece base 170' of FIGS. 24-26 are specifically noted herein.

With reference to FIGS. 24-26, the nosepiece base 170' includes a first side 290 (FIG. 24) and a second side 294 (FIG. 25) opposite the first side 290. The first side 290 at least partially defines the firing channel 178' of the nosepiece 162' (FIG. 26). The second side 294 has the surface 183' that is positioned adjacent the front end 166 of the magazine 14. The nosepiece base 170' further includes a longitudinally extending slot 298 (FIG. 24) that extends through the nosepiece base 170' from the first side 290 to the second side 294. The firing channel 178' defined at least partially by the first side 290 of the nosepiece base 170' is in communication with the fastener channel 182 of the magazine 14 via the longitudinally extending slot 298. More specifically, in the illustrated embodiment, the longitudinally extending slot 298 is partially defined by the rib 184' extending from the first side 290 of the nosepiece base 170'. In particular, the illustrated longitudinally extending slot 298 divides the rib 184' into two lips 302. The lips 302 extend parallel with the driving axis 38'.

The nosepiece base 170' further includes a plurality of recesses 306 (FIG. 25) extending partially through the nosepiece base 170' from the second side 294 toward the first side 290. Each recess 306 is configured to align with the corresponding guide pin slot 194 in the magazine 14 when assembled to the nosepiece base 170'. As such, each guide pin 198' of the magazine 14 is selectively receivable in a respective recess 306 (FIG. 26). In particular, each recess 306 has a first width W1 that is sized to receive the respective guide pin 198'. The longitudinally extending slot 298 has a second width W2 that is smaller than the first width W1.

The lips 302 of the rib 184' are configured to define an end of each recess 306. And a tip of each guide pin 198' is engageable with an interior surface (from the frame of reference of FIG. 26) of the lips 302 when the guide pin 198' is received within the respective recess 306. In other words, each recess 306 does not extend completely through the nosepiece base 170' to the firing channel 178'. Rather, each illustrated recess 306 is configured as a blind hole. As such, each guide pin 198' is inhibited from movement into the firing channel 178' of the nosepiece 162' by the lips 302. Accordingly, the first side 290 of the nosepiece base 170' has a uniform surface proximate and on both sides of the longitudinally extending slot 298.

Figure 28:
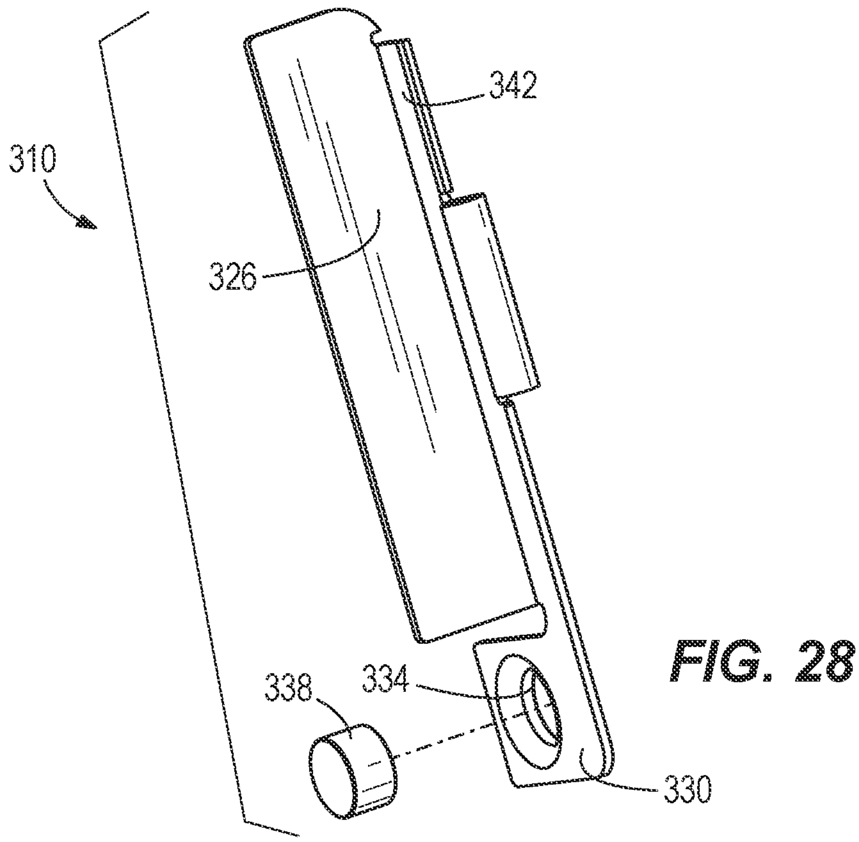
FIG. 28 is an exploded view of the pusher assembly of FIG. 27.
Figure 29:
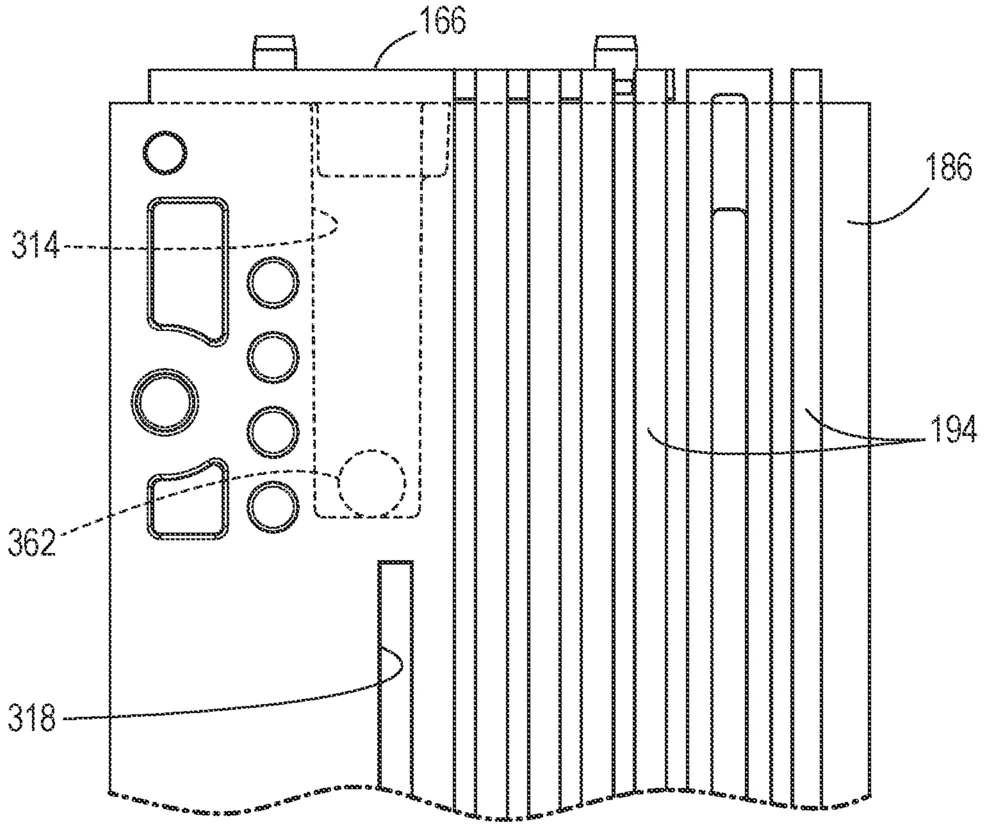
FIG. 29 is an enlarged view of the portion of the magazine of FIG. 27 with the pusher assembly and other elements removed.
Figure 30:
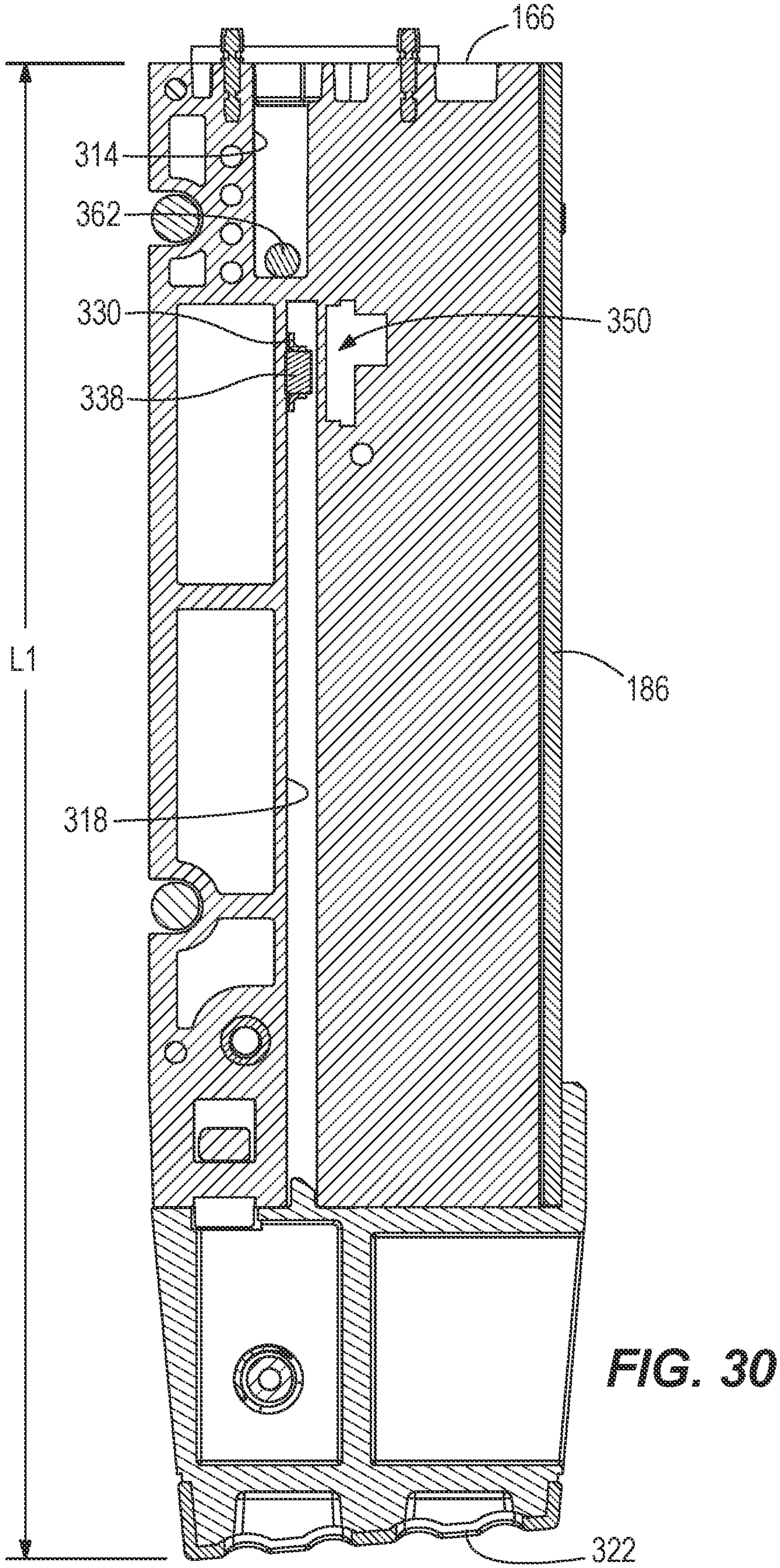
FIG. 30 is a cross-sectional view of the magazine of FIG. 14.

FIGS. 27-30 illustrate the base portion 186 of the magazine 14 and the pusher assembly 310 movably coupled to the base portion 186. The base portion 186 partially defines the fastener channel 182. In addition, the base portion 186 defines a first elongated slot 314 and a second elongated slot 318 (FIG. 30). The first elongated slot 314 extends from the front end 166 of the magazine 14 toward an opposite rear end 322. The second elongated slot 318 extends from proximate the first elongated slot 314 to proximate the rear end 322 of the magazine 14. The first elongated slot 314 is spaced away from the fastener channel 182. The second elongated slot 318 is spaced away from the first elongated slot 314. In addition, the second elongated slot 318 is in communication with the portion of the fastener channel 182 that receives the pusher assembly 310.

With particular reference to FIGS. 28 and 30, the pusher assembly 310 includes a body portion 326 and an extension portion 330 extending therefrom. The body portion 326 is received in the fastener channel 182. The extension portion 330 is received in the second elongated slot 318. The extension portion 330 is configured as a magnet holder. In the illustrated embodiment, the extension portion 330 includes a hole 334 configured to receive a permanent magnet 338. The illustrated pusher assembly 310 further includes a third portion 342 configured as a guide pin. As such, a first one of the guide pins 198 is integral with the pusher assembly 310. In other embodiments, the pusher assembly 310 may include only the body portion 326 and the extension portion 330.

With reference to FIGS. 1 and 30, the powered fastener driver 10 further includes a dry-fire lockout mechanism 350 having the extension portion 330 of the pusher assembly 310, which moves with the movement of the pusher assembly 310 in the magazine 14 toward the nosepiece 162. The dry-fire lockout mechanism 350 further includes a sensor 354 (FIG. 1; shown schematically) positioned within the base portion 186 of the magazine 14. The sensor 354 is electrically connected to an electronic controller (not shown) of the powered fastener driver 10. The controller controls operation (i.e., firing) of the powered fastener driver 10. In addition, the controller is electrically connected to the trigger 48 to receive an input therefrom.

The extension portion 330 of the pusher assembly 310 is configured to be selectively located proximate the sensor 354. More specifically, the magazine 14 defines a Length L1 (FIG. 30) extending between the front end 166 and the rear end 322. The sensor 354 is positioned at a predetermined location along the length L1 (i.e., closer to the front end 166). The sensor 354 is adjustable between a first state in which a firing operation is allowed when the trigger 48 is pressed, and a second state in which the firing operation is prevented even if the trigger 48 is pressed. The extension portion 330 is configured to adjust the sensor 354 from the first state to the second state when the extension portion 330 reaches the predetermined location. The predetermined location is selected based on the predetermined number of fasteners remaining. In one embodiment, the predetermined location is selected such that the extension portion 330 reaches the predetermined location when the predetermined number of fasteners remaining is one. In other embodiments, the predetermined location is selected such that the extension portion 330 reaches the predetermined location when the predetermined number of fasteners remaining is five. As such, the position of the predetermined location is configured to indicate to the controller when the magazine 14 is empty (i.e., zero fasteners remaining) or almost empty of the fasteners. Furthermore, the sensor 354 is adjustable from the second state to the first state after a user re-loads the magazine 14 with more fasteners 18.

In the illustrated embodiment, the sensor 354 is a non-contact sensor (e.g., a Hall-effect sensor) adjustable from the first state to the second state by the magnet 338 positioned on the extension portion 330. In other embodiments, instead of the sensor 354, the dry-fire lockout mechanism 350 may include a contact switch (e.g., a microswitch) and the extension portion 330 of the pusher assembly 310 may be configured to engage with or otherwise trip the contact switch for adjusting the switch between the first state and the second state.

With reference to FIG. 29 and the 30, the base portion 186 of the magazine 14 further includes another permanent magnet 362 received within the first elongated slot 314. The magnet 362 is fixed to the base portion 186 adjacent the second elongated slot 318. In some embodiments, the magnet 362 is received in a hole defined by the magazine 14 (i.e., the magnet 362 is press fitted) for coupling the magnet 362 to the magazine 14. In other embodiments, the magnet 362 is integral with (e.g., insert molded with) the magazine 14. Although the magnet 338 of the dry-fire lockout mechanism 350 is located near the magnet 362 as the extension portion 330 of the pusher assembly 310 approaches the predetermined location, the magnet 362 does not affect the magnetic field emanated by the magnet 338 and detected by the sensor 354. Rather, the magnet 362 attracts any fasteners that may unexpectedly fall into the first elongated slot 314 (e.g., if the fastener driver 10 is dropped and any individual fasteners separate from the collated strip within the magazine 14. By keeping any loose fasteners within the first elongated slot 314, the magnet 362 prohibits any loose fasteners from subsequently falling or otherwise moving into the second elongated slot 318. Furthermore, the magnet 362 is positioned within the magazine 14 to attract the fasteners remaining in the magazine 14 that are proximate the nosepiece 162. As such, the magnet 362 may be positioned to hold any loose fasteners in place within the magazine 14 (e.g., if the powered fastener driver 10 is dropped) and inhibit any loose fasteners from falling out of the magazine 14 when the magazine 14 is opened for re-loading.

Although the invention has been described in detail with reference to certain preferred embodiments, variations and modifications exist within the scope and spirit of one or more independent aspects of the invention as described.

Various features of the invention are set forth in the following claims.

What is claimed is:

1. A fastener driver comprising:

a cylinder;

a moveable piston positioned within the cylinder;

a driver blade attached to the piston and movable therewith between a top-dead-center (TDC) position and a bottom-dead-center (BDC) position, the driver blade including a body having a first end configured to be attached to the piston and a second end opposite the first end, wherein a length of the driver blade is defined between the first end and the second end, wherein a driving axis extends centrally through the first end and the second end along the length of the driver blade, wherein the driver blade includes a first side laterally offset from the driving axis, a second side opposite the first side and laterally offset from the driving axis, a front side, and a back side, and wherein the body includes a plurality of teeth extending laterally from the first side; and a lifter operable to move the driver blade from the BDC position toward the TDC position, the lifter including a plurality of lugs engageable with the teeth of the driver blade when moving the driver blade from the BDC position toward the TDC position;

wherein the body of the driver blade has a first thickness and at least a first tooth of the teeth has a second thickness that is greater than the first thickness, wherein a side of the at least first tooth and the back side of the driver blade lie in the same plane, wherein the body includes a width defined between the first side and the second side that is perpendicular to the length and the first thickness, and wherein the first tooth has a stepped configuration relative to the body.

2. The fastener driver of claim 1, wherein the body further includes a plurality of projections extending from the second side of the body.

3. The fastener driver of claim 1, wherein the first and second sides of the body extend between the first end and the second end.

4. The fastener driver of claim 3, wherein the first thickness is defined by the second side of the body proximate each of the first end and the second end.

5. The fastener driver of claim 1, wherein the first side of the body defines a first lateral edge and a second side of the body defines a second lateral edge, and wherein the first thickness is defined by the second lateral edge.

6. The fastener driver of claim 5, wherein the driver blade includes a slot extending along the driving axis and located between the first and second sides of the body.

7. The fastener driver of claim 6, further comprising a nosepiece through which consecutive fasteners are driven by the driver blade, wherein the nosepiece includes a rib received in the slot.

8. The fastener driver of claim 1, wherein a second tooth of the plurality of teeth also has the same second thickness as the first tooth.

9. The fastener driver of claim 1, wherein the body and each of the teeth are bisected by a common plane that is perpendicular to the driving axis, and wherein the first side and the second side are each laterally offset the driving axis in a direction along the common plane.

10. A fastener driver comprising:

a cylinder;

a moveable piston positioned within the cylinder;

a driver blade attached to the piston and movable therewith between a top-dead-center (TDC) position and a bottom-dead-center (BDC) position, the driver blade including a body having a first end configured to be attached to the piston and a second end opposite the first end, wherein a length of the driver blade is defined between the first end and the second end, wherein a driving axis extends centrally through the first end and the second end along the length of the driver blade, wherein the body includes a first side defining a first lateral edge offset from the driving axis, a second side defining a second lateral edge offset from the driving axis, a front side, and a back side, the body having a plurality of teeth extending laterally from the first side; and a lifter operable to move the driver blade from the BDC position toward the TDC position, the lifter including a plurality of lugs engageable with the teeth of the driver blade when moving the driver blade from the BDC position toward the TDC position;

wherein the second lateral edge of the driver blade has a first thickness and at least a first tooth of the teeth has a second thickness that is greater than the first thickness, wherein a side of the at least first tooth and the back side of the driver blade lie in the same plane, wherein the body includes a width defined between the first side and the second side that is perpendicular to the length and the first thickness, wherein the first thickness is less than the width, and wherein the first tooth has a stepped configuration relative to the body.

11. The fastener driver of claim 10, wherein the body further includes a plurality of protrusions extending from the second side of the body.

12. The fastener driver of claim 10, wherein the driver blade includes a slot extending along the driving axis between the first and second lateral edges.

13. The fastener driver of claim 12, further comprising a nosepiece through which consecutive fasteners are driven by the driver blade, wherein the nosepiece includes a rib received in the slot.

14. The fastener driver of claim 10, wherein the first and second sides of the body extend between the first end and the second end, and wherein the first thickness is defined by the second side of the body proximate each of the first end and the second end.

15. The fastener driver of claim 10, wherein the body and each of the teeth are bisected by a common plane that is perpendicular to the driving axis, and wherein the first side and the second side are each laterally offset the driving axis in a direction along the common plane.

16. A fastener driver comprising:

a cylinder;

a moveable piston positioned within the cylinder;

a driver blade attached to the piston and movable therewith between a top-dead-center (TDC) position and a bottom-dead-center (BDC) position, the driver blade including a body having a first end configured to be attached to the piston and a second end opposite the first end, wherein a length of the driver blade is defined between the first end and the second end, wherein a driving axis extends centrally through the first end and the second end along the length of the driver blade, wherein the driver blade includes a first side laterally offset from the driving axis, a second side opposite the first side and laterally offset from the driving axis, a front side, and a back side, and wherein the body includes a plurality of teeth extending laterally from the first side;

a lifter operable to move the driver blade from the BDC position toward the TDC position, the lifter including a hub and a plurality of lugs extending therefrom, the plurality of lugs engageable with the teeth of the driver blade when moving the driver blade from the BDC position toward the TDC position; and a transmission provided for providing torque to the lifter, wherein each lug is configured as a first type or a second type, wherein a portion of the lug of the first type is configured to rotate relative to the hub, wherein the lug of the second type is fixed relative to the hub, wherein a first one of the lugs is the first type, wherein the body of the driver blade has a first thickness and at least a first tooth and a second tooth of the plurality of teeth each has a second thickness that is greater than the first thickness, wherein a side of the at least first tooth and the back side of the driver blade lie in the same plane, wherein the body includes a width defined between the first side and the second side that is perpendicular to the length and the first thickness, wherein each of the first and second teeth has a stepped configuration relative to the body, and wherein each of the first and second teeth are engageable with the first one of the lugs of the first type.

17. The fastener driver of claim 16, wherein each lug of the first type includes a pin configured to rotatably support a roller that is rotatable relative to the hub.

18. The fastener driver of claim 16, wherein the lifter is coupled for co-rotation with an output shaft of the transmission.

19. The fastener driver of claim 16, wherein the body further includes a plurality of protrusions extending from the second side of the body.

20. The fastener driver of claim 16, further comprising a nosepiece through which consecutive fasteners are driven by the driver blade, wherein the driver blade defines a driving axis, wherein the driver blade includes a slot extending along the driving axis, and wherein the nosepiece includes a rib received in the slot.

21. The fastener driver of claim 16, wherein the body and each of the teeth are bisected by a common plane that is perpendicular to the driving axis, and wherein the first side and the second side are each laterally offset the driving axis in a direction along the common plane.

* * * * *